US012626956B2

(12) United States Patent
    Gaben et al.

(10) Patent No.: US 12,626,956 B2
(45) Date of Patent: May 12, 2026

(54) METHOD FOR MANUFACTURING BATTERIES AND BATTERY OBTAINED BY SAID METHOD

(71) Applicant: I-TEN, Dardilly (FR)

(72) Inventors: Fabien Gaben, Dardilly (FR); Frédéric Cantin, Tassin la Demi-Lune (FR)

(73) Assignee: I-TEN, Dardilly (FR)

( * ) Notice: Subject to any disclaimer, the term of this patent is extended or adjusted under 35 U.S.C. 154(b) by 818 days.

(21) Appl. No.: 17/415,008

(22) PCT Filed: Dec. 24, 2019

(86) PCT No.: PCT/FR2019/000220
    § 371 (c)(1),
    (2) Date: Jun. 17, 2021

(87) PCT Pub. No.: WO2020/136313
    PCT Pub. Date: Jul. 2, 2020

(65) Prior Publication Data
    US 2022/0069357 A1     Mar. 3, 2022

(30) Foreign Application Priority Data

Dec. 24, 2018   (FR) ...................................... 1874096

(51) Int. Cl.
    *H01M 10/0585*      (2010.01)
    *H01M 50/121*       (2021.01)
              (Continued)

(52) U.S. Cl.
    CPC ..... *H01M 10/0585* (2013.01); *H01M 50/121* (2021.01); *H01M 50/126* (2021.01); *H01M 50/54* (2021.01)

(58) Field of Classification Search
    CPC ........... H01M 10/0585; H01M 50/126; H01M 50/121; H01M 50/54
    See application file for complete search history.

(56)                References Cited

U.S. PATENT DOCUMENTS 2,312,232  A      2/1943   Bol
    3,959,022  A      5/1976   DeJonghe et al.
                      (Continued)

FOREIGN PATENT DOCUMENTS

BE          854762       11/1977
    CN        1560948  A      1/2005
                      (Continued)

OTHER PUBLICATIONS

Office action received in JP Application No. 2021532459, Dated Dec. 19, 2023, pp. 5.

(Continued)

*Primary Examiner* — Matthew T Martin
*Assistant Examiner* — Katherine N Higgins
(74) *Attorney, Agent, or Firm* — Harness, Dickey & Pierce, P.L.C.

(57)                ABSTRACT

Battery comprising at least one anode and at least one cathode, arranged on top of one another in an alternating manner, the battery comprising lateral edges and longitudinal edges, in which the anode comprises a current collector substrate, —at least one anode layer, and —optionally, a layer of an electrolyte material, and the cathode comprises: —a current collector substrate, at least one cathode layer, and —optionally a layer of an electrolyte material such that the battery comprises successively at least one anode layer, at least one layer of an electrolyte material and at least one cathode layer, characterized in that each anode and each cathode comprises a respective main body, separated from a respective secondary body by a space that is free of any electrode, electrolyte and/or current collector substrate material, the free space joining or extending between the opposite longitudinal edges of the battery.

15 Claims, 10 Drawing Sheets

(51) Int. Cl.
*H01M 50/126* (2021.01)
*H01M 50/54* (2021.01)

(56) References Cited

U.S. PATENT DOCUMENTS

| | | | |
|---|---|---|---|
| 5,006,248 A | 4/1991 | Anderson et al. | |
| 5,518,839 A | 5/1996 | Olsen | |
| 5,561,004 A | 10/1996 | Bates et al. | |
| 5,846,664 A | 12/1998 | Third et al. | |
| 6,159,637 A | 12/2000 | Shizuka et al. | |
| 6,242,132 B1 | 6/2001 | Neudecker et al. | |
| 6,251,473 B1 | 6/2001 | Wang et al. | |
| 6,607,645 B1 | 8/2003 | Sarkar | |
| 6,664,006 B1 | 12/2003 | Munshi | |
| 6,841,497 B1 | 1/2005 | Krell et al. | |
| 6,887,361 B1 | 5/2005 | Visco et al. | |
| 7,285,334 B1 | 10/2007 | Yamashita et al. | |
| 7,473,088 B2 | 1/2009 | Ho et al. | |
| 7,662,265 B2 | 2/2010 | Chiang et al. | |
| 7,695,865 B2 | 4/2010 | Saito et al. | |
| 7,828,619 B1 | 11/2010 | Yeh | |
| 7,829,225 B2 | 11/2010 | Salot et al. | |
| 8,877,388 B1 * | 11/2014 | Ihlefeld | H01M 50/403 |
| | | | 429/304 |
| 9,515,319 B2 | 12/2016 | Harada et al. | |
| 9,627,717 B1 | 4/2017 | Langlois et al. | |
| 2001/0041294 A1 | 11/2001 | Chu et al. | |
| 2002/0034688 A1 | 3/2002 | Chu et al. | |
| 2002/0071989 A1 * | 6/2002 | Verma | H01M 50/14 |
| | | | 29/623.5 |
| 2002/0172871 A1 | 11/2002 | Schucker | |
| 2003/0003237 A1 | 1/2003 | Seabaugh et al. | |
| 2003/0012952 A1 | 1/2003 | Yadav et al. | |
| 2003/0064292 A1 | 4/2003 | Neudecker et al. | |
| 2003/0102222 A1 | 6/2003 | Zhou et al. | |
| 2003/0134176 A1 | 7/2003 | Sarkar | |
| 2004/0011433 A1 | 1/2004 | Shiozaki et al. | |
| 2004/0020916 A1 | 2/2004 | Mangina | |
| 2004/0126653 A1 | 7/2004 | Visco et al. | |
| 2004/0157121 A1 | 8/2004 | Watanabe et al. | |
| 2004/0166417 A1 | 8/2004 | Nishio et al. | |
| 2004/0185336 A1 | 9/2004 | Ito et al. | |
| 2004/0209163 A1 | 10/2004 | Watanabe et al. | |
| 2004/0214085 A1 | 10/2004 | Sheem et al. | |
| 2004/0222098 A1 | 11/2004 | Clasen et al. | |
| 2004/0248011 A1 | 12/2004 | Asao et al. | |
| 2004/0253512 A1 | 12/2004 | Watanabe et al. | |
| 2004/0259713 A1 | 12/2004 | Frey | |
| 2005/0132562 A1 | 6/2005 | Saito et al. | |
| 2005/0272214 A1 | 12/2005 | Chiang et al. | |
| 2005/0284320 A1 | 12/2005 | Sakuarai et al. | |
| 2006/0198917 A1 | 9/2006 | Ho et al. | |
| 2007/0015061 A1 | 1/2007 | Klaassen | |
| 2007/0018434 A1 | 1/2007 | Hayashi | |
| 2007/0048611 A1 | 3/2007 | Yamamoto et al. | |
| 2007/0111089 A1 * | 5/2007 | Swan | H01M 50/536 |
| | | | 429/162 |
| 2007/0184345 A1 | 8/2007 | Neudecker et al. | |
| 2008/0226986 A1 | 9/2008 | Nakahara et al. | |
| 2008/0286651 A1 | 11/2008 | Neudecker et al. | |
| 2008/0290022 A1 | 11/2008 | Sanchez et al. | |
| 2009/0053589 A1 | 2/2009 | Obrovac et al. | |
| 2009/0114275 A1 | 5/2009 | Zaban et al. | |
| 2009/0162755 A1 | 6/2009 | Neudecker | |
| 2009/0202899 A1 | 8/2009 | Pyszczek | |
| 2009/0214957 A1 | 8/2009 | Okada et al. | |
| 2010/0035157 A1 | 2/2010 | Nakamura | |
| 2010/0040948 A1 | 2/2010 | Takano et al. | |
| 2010/0104682 A1 | 4/2010 | Ando et al. | |
| 2010/0216032 A1 | 8/2010 | Baba et al. | |
| 2010/0227209 A1 | 9/2010 | Kim | |
| 2010/0302704 A1 | 12/2010 | Ogawa et al. | |
| 2011/0017152 A1 | 1/2011 | Min | |
| 2011/0045351 A1 | 2/2011 | Peled et al. | |
| 2011/0076550 A1 | 3/2011 | Liang et al. | |

| | | | |
|---|---|---|---|
| 2011/0100532 A1 | 5/2011 | Lee et al. | |
| 2011/0104571 A1 | 5/2011 | Zhamu et al. | |
| 2011/0123866 A1 | 5/2011 | Pan et al. | |
| 2011/0171528 A1 | 7/2011 | Oladeji | |
| 2011/0227000 A1 | 9/2011 | Ruoff et al. | |
| 2011/0240112 A1 | 10/2011 | Ahn et al. | |
| 2011/0269025 A1 | 11/2011 | Sun et al. | |
| 2012/0045685 A1 * | 2/2012 | Seki | H01M 4/13 |
| | | | 29/25.03 |
| 2012/0073642 A1 | 3/2012 | Chen et al. | |
| 2012/0202120 A1 | 8/2012 | Kim et al. | |
| 2012/0211365 A1 | 8/2012 | Joung et al. | |
| 2012/0216394 A1 | 8/2012 | Kitaura et al. | |
| 2013/0127335 A1 | 5/2013 | Chang et al. | |
| 2013/0209893 A1 | 8/2013 | Archer et al. | |
| 2013/0244102 A1 | 9/2013 | Golodnitsky et al. | |
| 2014/0057162 A1 | 2/2014 | Schneider et al. | |
| 2014/0170524 A1 | 6/2014 | Chiang et al. | |
| 2014/0178759 A1 | 6/2014 | Worsley et al. | |
| 2014/0308576 A1 | 10/2014 | Gaben et al. | |
| 2014/0319974 A1 | 10/2014 | Feichtinger et al. | |
| 2014/0370365 A1 | 12/2014 | Kubota et al. | |
| 2015/0086848 A1 * | 3/2015 | Prochazka, Jr. | H01M 4/525 |
| | | | 429/163 |
| 2015/0099190 A1 | 4/2015 | Holme et al. | |
| 2016/0001351 A1 | 1/2016 | Gaben | |
| 2016/0013513 A1 | 1/2016 | Gaben | |
| 2016/0172682 A1 | 6/2016 | Martin et al. | |
| 2016/0183327 A1 | 6/2016 | Engel et al. | |
| 2016/0293907 A1 * | 10/2016 | Chen | H01M 50/24 |
| 2018/0212210 A1 | 7/2018 | Suzuki | |
| 2018/0286594 A1 | 10/2018 | Kim et al. | |

FOREIGN PATENT DOCUMENTS

| | | | |
|---|---|---|---|
| CN | 1945881 A | 4/2007 | |
| CN | 101076914 A | 11/2007 | |
| CN | 101174698 B | 5/2008 | |
| CN | 101310400 B | 11/2008 | |
| CN | 101365741 A | 2/2009 | |
| CN | 101388470 B | 3/2009 | |
| CN | 101468370 B | 7/2009 | |
| CN | 101675553 B | 3/2010 | |
| CN | 101733994 B | 6/2010 | |
| CN | 101758638 A | 6/2010 | |
| CN | 102237320 A | 11/2011 | |
| CN | 102859759 B | 1/2013 | |
| CN | 103158252 B | 6/2013 | |
| CN | 103568356 A | 2/2014 | |
| CN | 105552254 A | 5/2016 | |
| DE | 202006008399 | 8/2006 | |
| EP | 453796 B1 | 10/1991 | |
| EP | 523840 B1 | 1/1993 | |
| EP | 1049188 B1 | 11/2000 | |
| EP | 1295968 B1 | 3/2003 | |
| EP | 1424743 B1 | 6/2004 | |
| EP | 1475462 A3 | 11/2004 | |
| EP | 1926164 A1 | 5/2008 | |
| EP | 2037527 B1 | 3/2009 | |
| EP | 2251188 A2 | 11/2010 | |
| EP | 2432065 A1 | 3/2012 | |
| EP | 2868770 B1 | 5/2015 | |
| FR | 2880198 B1 | 6/2006 | |
| FR | 2893623 A1 | 5/2007 | |
| FR | 2956523 A1 | 8/2011 | |
| FR | 2981952 B1 | 5/2013 | |
| FR | 2982083 A1 | 5/2013 | |
| FR | 2982084 B1 | 5/2013 | |
| FR | 3014425 A1 | 6/2015 | |
| FR | 3023302 A1 | 1/2016 | |
| JP | 10102294 A | 4/1998 | |
| JP | 11149820 A | 6/1999 | |
| JP | 2000343300 A | 12/2000 | |
| JP | 2002042790 A | 2/2002 | |
| JP | 2002042792 A | 2/2002 | |
| JP | 2002203562 A | 7/2002 | |
| JP | 2003532609 A | 11/2003 | |
| JP | 2004185862 A | 7/2004 | |
| JP | 2005085716 A | 3/2005 | |

(56) References Cited

FOREIGN PATENT DOCUMENTS

| JP | 2006073487 A | 3/2006 |
|----|--------------|--------|
| JP | 2006136916 A | 6/2006 |
| JP | 2007005279 A | 1/2007 |
| JP | 2007048647 A | 2/2007 |
| JP | 2007080812 A | 3/2007 |
| JP | 2007123081 A | 5/2007 |
| JP | 2007123192 A | 5/2007 |
| JP | 2007266327 A | 10/2007 |
| JP | 2008171588 A | 7/2008 |
| JP | 2008246392 A | 10/2008 |
| JP | 2009516359 A | 4/2009 |
| JP | 2009176541 A | 8/2009 |
| JP | 2009181920 A | 8/2009 |
| JP | 2009193802 A | 8/2009 |
| JP | 2009193888 A | 8/2009 |
| JP | 2009544141 A | 12/2009 |
| JP | 2010029791 A | 2/2010 |
| JP | 2010080422 A | 4/2010 |
| JP | 2010102841 A | 5/2010 |
| JP | 2010126735 A | 6/2010 |
| JP | 4501247 B2 | 7/2010 |
| JP | 2010170854 A | 8/2010 |
| JP | 2010170972 A | 8/2010 |
| JP | 2010186626 A | 8/2010 |
| JP | 2010528424 A | 8/2010 |
| JP | 2010205449 A | 9/2010 |
| JP | 2010212161 A | 9/2010 |
| JP | 2010278373 A | 12/2010 |
| JP | 2011511399 A | 4/2011 |
| JP | 2011126746 A | 6/2011 |
| JP | 2011181331 A | 9/2011 |
| JP | 2011191343 A | 9/2011 |
| JP | 2012014892 A | 1/2012 |
| JP | 2012142095 A | 7/2012 |
| JP | 2012238545 A | 12/2012 |
| JP | 2014022321 A | 2/2014 |
| JP | 5576636 B2 | 8/2014 |
| KR | 10-0580442 B1 | 5/2006 |
| KR | 10-2007-0017062 A | 2/2007 |
| KR | 20070094156 A | 9/2007 |
| KR | 10-2008-0070828 A | 7/2008 |
| KR | 10-2013-0014531 A | 2/2013 |
| SU | 498666 A1 | 1/1976 |
| WO | 2000/069790 A2 | 11/2000 |
| WO | 2001/070392 A1 | 9/2001 |
| WO | 2002/003430 A2 | 1/2002 |
| WO | 2002/075826 A2 | 9/2002 |
| WO | 2004/051769 A2 | 6/2004 |
| WO | 2006/082846 A1 | 8/2006 |
| WO | 2007/061928 A3 | 5/2007 |
| WO | 2007/086218 A1 | 8/2007 |
| WO | 2008/089110 A1 | 7/2008 |
| WO | 2008/143027 A1 | 11/2008 |
| WO | 2009/048300 A3 | 4/2009 |
| WO | 2009/119358 A1 | 10/2009 |
| WO | 2010/011569 A1 | 1/2010 |
| WO | 2010/076428 A1 | 7/2010 |
| WO | 2010/119443 A1 | 10/2010 |
| WO | 2011/120052 A1 | 9/2011 |
| WO | 2011/128976 A1 | 10/2011 |
| WO | 2012/076950 A1 | 6/2012 |
| WO | 2012/091111 A1 | 7/2012 |
| WO | 2012/101501 A1 | 8/2012 |
| WO | 2013/064773 A1 | 5/2013 |
| WO | 2013/064777 A1 | 5/2013 |
| WO | 2013/064779 A1 | 5/2013 |
| WO | 2013/064781 A1 | 5/2013 |
| WO | 2014/102520 A1 | 7/2014 |
| WO | 2014/131997 A2 | 9/2014 |
| WO | 2016/001584 A1 | 1/2016 |
| WO | 2016/001588 A1 | 1/2016 |
| WO | 2016/025067 A1 | 2/2016 |
| WO | 2016/176491 A1 | 11/2016 |
| WO | 2016/205780 A1 | 12/2016 |
| WO | 2017/115032 A1 | 7/2017 |
| WO | 2017/131676 A1 | 8/2017 |
| WO | 2018/037185 A1 | 3/2018 |

OTHER PUBLICATIONS

Office action received in CN Application No. 201980085989.1, Dated Apr. 12, 2024, pp. 23.

Supplementary search received in CN Application No. 201980085989.1, Dated Apr. 12, 2024, pp. 2.

Amatucci G.G et al., "Lithium scandium phosphate-based electrolyes for solid state lithium rechargeable microbatteries", Solid state ionics (1993) vol. 60, pp. 357-365.

Andrzejewska E. et al., "Highly conductive solid polymer-(ionic liquid) electrolytesprepared byin situphotopolymerization", POLIMERY (2006) vol. 51, pp. 11-12.

Aono H. et al., "Ionic conductivity and sinterability of lithium titanium phosphate system", Solid state ionics (1990) vol. 40/41 pp. 38-42.

Arimura M. et al., "Preparation of barium titanate nanoparticle thin films ny the electrophoretic deposition metho using polyacrylic acid as a charge-compensating agent", Key Engineering Materials (2010) vols. 421-422 pp. 510-513.

Azar M. "Mise en forme et frittage des poudres de ceramique nanostructurees : Cas d'une alumine de transition" Thesis (2009).

Balan P. et al., "Effect of nanoparticle addition in hybrid sol-gel silane coating on corrosion resistance of low carbon steel", Advanced Materials Research (2013) vol. 686 pp. 244-249.

Benehkohal N.P. et al., "Enabling Green Fabrication of Li-Ion Battery Electrodes by Electrophoretic Deposition: Growth of Thick Binder-Free Mesoporous TiO 2—Carbon Anode Films", Journal of The Electrochemical Society (2015) vol. 162(11) pp. D3013-D3018.

Bo Z. et al., "Plasma-enhanced chemical vapor deposition synthesisof vertically oriented graphene nanosheets", Nanoscale (2013) vol. 5 p. 5180-5204.

Caballero A. et al., "LiNi0.5Mn1.504thick-film electrodes prepared by electrophoreticdeposition for use in high voltage lithium-ion batteries", Journal of Power Sources (2006) vol. 158 pp. 583-590.

Cannarella J. et al., "The Effects of Defects on Localized Plating in Lithium-IonBatteries", Journal of The Electrochemical Society (2015) vol. 162 n°7 pp. A1365-A1373.

Cao C. et al., "Recent advances in inorganic solid electrolytes for lithium batteries", frontiers in Energy Research (2014) vol. 2, article 25 pp. 1-10.

Castro Y. et al., "Silica Sol-Gel Coatings on Metals Produced by EPD", Journal of Sol-Gel Science and Technology (2003) vol. 26, pp. 735-739.

Colin J.F. et al., "A Novel Layered Titanoniobate LiTiNbO5: Topotactic Synthesis andElectrochemistry versus Lithium", Inorganic Chemistry (2006) vol. 45, No. 18, pp. 7217-7223.

Dutta A., "kinetics of neck formation during nanoparticle sintering : approach of dimensionality reduction", Rev. Adv. Mater. Sci (2014) vol. 39 pp. 25-33.

Ferrari B. et al., "EPD kinetics: A review", Journal of the European Ceramic Society (2010) vol. 30, pp. 1069-1078.

Guo B. et al., "A long-life lithium-ion battery with a highly porous TiNb2O7 anode for large-scale electrical energy storage", Energy & Environmental Science (2014) vol. 7 pp. 2220-2226.

Ha D.H et al., "Binder-Free and Carbon-Free Nanoparticle Batteries: A Method forNanoparticle Electrodes without Polymeric Binders or Carbon Black", Nanoletters (2012) vol. 12, n°10 pp. 5122-5130.

Han J.T. et al., "New Anode Framework for Rechargeable Lithium Batteries", Chemistry of materials, (2011) vol. 23 pp. 2027-2029.

Huang Y. et al., "Synthesis and electrochemical properties of spinelli4Ti5O12-xClxanode materials for lithium-ion batteries", J Solid State Electrochem (2012) vol. 16 pp. 2011-2016.

Ise K. et al., "Large lithium storage in highly crystalline TiNb2O7 nanoparticles synthesized by a hydrothermal method as anodes for lithium-ion batteries", Solid State Ionics (2018) vol. 320 pp. 7-15.

(56) References Cited

OTHER PUBLICATIONS

Ishihara A. et al., "Titanium-Niobium Oxides as Non-Noble Metal Cathodes for Polymer Electrolyte Fuel Cells" Catalysts (2015), vol. 5, pp. 1289-1303.

Islam S. et al., "Preparation and characterization of crack-free sol-gel basedSiO2-TiO2hybrid nanoparticle film", J Sol-Gel Sci Technol (2013) vol. 68 pp. 162-168.

Ji S. et al., "Preparation and effects of Mg-doping on the electrochemical properties of spinelLi4Ti5O12as anode material for lithium ion battery", Materials Chemistry and Physics (2010) vol. 123 pp. 510-515.

Kim H.J. et al., "Controlled prelithiation of silicon monoxide for high performance lithium-ion rechargeable full cells", Nanoletters (2015) vol. 16, n°1, p. 282-288 (XP55558866A).

Kim J.G. et al., "A review of lithium and non-lithium based solid state batteries", Journal of power sources (2015) vol. 282 pp. 299-322.

Kim J.W. et al., "Surface chemistry of LiNi0.5Mn1.5O4particles coated by Al2O3usingatomic layer deposition for lithium-ion batteries", Journal of Power Sources (2015) vol. 274 pp. 1254-1262.

Li B. et al., "Facile synthesis of Li4Ti5O12/C composite with super rate performance", Energy & Environmental Science (2012) vol. 5 pp. 9595-9602.

Li J. et al., "Highly dispersed Pt nanoparticle catalyst prepared by atomic layer deposition", Applied catalysis B : environnmental (2010) vol. 97 pp. 220-226 (XP027057416).

Li X. et al., "Structural and electrochemical performances of Li4Ti5-xZrxO12as anode materialfor lithium-ion batteries", Journal of Alloys and Compounds (2009) vol. 487 pp. L12-L17.

Liddle B.J. et al., "A new one-pot hydrothermal synthesis and electrochemical characterizationof Li1+xMn2 yO4spinel structured compounds", Energy & Environmental Science (2010) vol. 3, pp. 1339-1346.

Lu J. et al., "High-Performance Anode Materials for Rechargeable Lithium-Ion Batteries", Electrochemical Energy Reviews (2018) vol. 1 pp. 35-53.

Lu X. et al., "Atomic-scale investigation on lithium storage mechanism in TiNb2O7", Energy & Environmental Science (2011) vol. 4 pp. 2638-2644.

Luo J., "Interfacial engineering of solid electrolytes", Journal of Materiomics (2015) vol. 1, Issue 1, pp. 22-32.

Maunel et al., "Review on composite polymer electrolytes for lithium batteries", Polymer (2006) vol. 47 pp. 5952-5964.

Mosa J. et al., "Li4Ti5O12thin-film electrodes by solegel for lithium-ionmicrobatteries", Journal of power sources (2013) vol. 244 pp. 482-487.

Nakagawa A. et al., "Characterization of Stable Solid Electrolyte Lithium Silicate for Thin Film Lithium Battery", Proc. Brd Int. Conf. Physics of Solid State Ionics (ICPSSI-3), J. Phys. Soc. Jpn. (2010) vol. 79, Suppl. A, pp. 98-101.

Neudecker et al., "Lithium silicon tin oxynitride (LiySiTON) : high-performance anode in thin-film lithium-ion batteries for microelectronics", Journal of Powder Sources, vol. 81 (1999) p. 27-32 (XP55558948A).

Ni H. et al., "Enhanced rate performance of lithium titanium oxide anodematerial by bromine doping", Ionics (2015) vol. 21 pp. 3169-3176.

Niedzicki L. et al., "Lithium cation conducting TDI anion-basedionic liquids", Phys.Chem.Chem.Phys. (2014) vol. 16 pp. 11417-11425.

Nitta N. et al., "Li-ion battery materials: present and future", Elsevier Enhanced Reader, Materials Today, (2015) vol. 18, No. 5 pp. 252-264.

Ohta N. et al., "Enhancement of the High-Rate Capability of Solid-State LithiumBatteries by Nanoscale Interfacial Modification", Adv. Mater. (2006) vol. 18, pp. 2226-2229.

Okada K et al., "Preparation and electrochemical properties of LiAlO2-coatedLi(Ni1/3Mn1/3Co1/3)O2for all-solid- state batteries", Solid State Ionics (2014) vol. 255 pp. 120-127.

O'reilly M.V. et al., "Silica nanoparticles densely grafted with PEO for ionomer plasticization", RSC Advances (2015) vol. 5, pp. 19570-19580.

Park H. et al., "Porosity-Controlled TiNb 2 O 7 Microspheres with Partial Nitridation as A Practical Negative Electrode for High-Power Lithium-Ion Batteries", Advanced Energy Materials (2015), 1401945, pp. 1-7.

Qi Y. et al., "Preparation and characterization of novel spinel Li4Ti5O12-xBrxanode materials", Electrochimica Acta (2009) vol. 54 pp. 4772-4776.

Rho Y.H. et al., "LiCoO2and LiMn2O4Thin-Film Electrodesfor Rechargeable Lithium Batteries, Preparation Using PVP Sol-Gel to Produce ExcellentElectrochemical Properties", Journal of The Electrochemical Society (2003) vol. 150 n°1 pp. A107-A111.

Rho Y.H. et al., "Preparation of Li4/3Ti5/3O4Thin Film Anode with High Electrochemical Response forRechargeable Lithium Batteries by Sol-Gel Method", Chemistry Letters (2001) pp. 1322-1323.

Rho Y.H. et al., "Preparation of Li4'3Ti5'3O4Thin Film Electrodesby a PVP Sol-Gel Coating Method and TheirElectrochemical Properties", Journal of The Electrochemical Society (2004) vol. 151, n°1 pp. A106-A110.

Richards W.D. et al., "Interface Stability in Solid-State Batteries", Chemistry of Materials (2016) vol. 28, pp. 266-273.

Ruzmetov D. et al., "Electrolyte Stability Determines Scaling Limits for Solid-State 3DLi Ion Batteries", nanoletters, vol. 12, 2012, pp. 505-511.

Santhanagopalan D. et al., "Interface Limited Lithium Transport in Solid-State Batteries", J.Phys.Chem.Lett., vol. 5, 2014, pp. 298-303.

Shen L. et al., "Hydrogenated Li 4 Ti 5 O 12 Nanowire Arrays for High Rate Lithium Ion Batteries", Adv.Mater. (2012) vol. 24, pp. 6502-6506.

Song H. et al., "Anomalous decrease in structural disorder due to charge redistribution inCr-doped Li4Ti5O12negative-electrode materials for high-rate Li-ionbatteries", Energy &Environmental Science (2012) vol. 5 pp. 9903-9913.

Takada K. et al., "Progress and prospective of solid-state lithium batteries", Acta Materialia (2013) vol. 61 pp. 759-770.

Taleghani S.T. et al., "A study on the Effect of Porosity and Particle Size Distribution on Li-Ion Battery Performance", J . Electrochem. Soc. (2017) vol. 164 issue11, p. E3179-E3189.

Tatsumisago M. et al., "Preparation of Li3BO3-Li2SO4 glass-ceramic electrolytes for all-oxidelithium batteries", Journal of Power Sources (2014) vol. 270 pp. 603-607.

Tian B. et al., "Niobium doped lithium titanate as a high rate anode material for Li-ion batteries", Electrochimica Acta (2010) vol. 55 pp. 5453-5458.

Trevey, "Advances and development of all-solid-state lithium-ion batteries", mechanical engineering graduate theses & dissertations 17, 2011 by James Edward Trevey, 2011.

Uemura T. et al., "All-solid secondary batteries with sulfide-based thinfilm electrolytes", Journal of power Sources (2013) vol. 240 pp. 510-514.

Wang Q. et al., "A constitutive model of nanocomposite hydrogels with nanoparticle crosslinkers", Journal of the Mechanics and Physics of Solids (2016) vol. 94, pp. 127-147.

Wang Y.Q. et al., "Rutile-TiO2Nanocoating for a High-Rate Li4Ti5O12Anode of aLithium-Ion Battery", JACS (2012) vol. 134, pp. 7874-7879.

Wolfenstine J. et al., "Electrical conductivity and charge compensation in Ta doped Li4Ti5O12", Journal of Power Sources (2008) vol. 180 pp. 582-585.

Wood D.L. et al., "Technical and economic analysis of solvent-based lithium-ion electrode drying with water and NMP", Drying Technology (2018) vol. 36 n°2 pp. 234-244.

Kiao R. et al., "Candidate structures for inorganic lithium solid-state electrolytes identified by high-throughput bond-valence calculations", J. Materiomics (2015) vol. 1 pp. 325-332.

Xie H. et al., "Li1,2Zr1,9Ca0,1(PO4)3, a room temperature Li-ion solid electrolyte", Journal of power sources (2011) vol. 196 pp. 7760-7762.

(56) References Cited

OTHER PUBLICATIONS

Yamada H. "Interfaces of solid electrolytes: fundamentals and applications", Journal of the Indian Institute of science (2016) vol. 96 issue 4 pp. 315-323.

Yang C. et al., "Continuous plating/stripping behavior of solid-state lithium metal anode in a 3D ion-conductive framework", PNAS (2018) vol. 115, issue 15, pp. 3770-3775.

Yao X. et al., "All-solid-state lithium batteries with inorganic solid electrolytes:Review of fundamental science", Chin. Phys. B (2016) vol. 25, No. 1 pp. 018802-01 to 018802-14.

Yi T-F. et al., "High rate cycling performance of lanthanum-modified Li4Ti5O12 anode materials for lithium-ion batteries", Journal of Power Sources (2012) vol. 214 pp. 220-226.

Yi T-F. et al., "High-performance Li4Ti5-xVxO12(0≤x≤0.3) as an anode material for secondary lithium-ion battery", Electrochimica Acta (2009) vol. 54 pp. 7464-7470.

Yi T-F. et al., "Improving the high rate performance of Li4Ti5O12through divalent zinc substitution", Journal of Power Sources (2012) vol. 215 pp. 258-265.

You H.C. et al., "Facile preparation of sol-gel-derived ultra thin and high-dielectric zirconia films for capacitor devices", Applied Surface Science (2012) vol. 258 p. 10084-10088.

You H.C. et al., "Physical Characterization and Electrical Properties of Sol-Gel-Derived Zirconia Films", Journal of The Electrochemical Society (2006) vol. 153 n°6 pp. F94-F99.

Yu et al., "Mesoporous Li4Ti5O12 Hollow Spheres with Enhanced Lithium Storage Capability", Adv.Mater.(2013) vol. 25, pp. 2296-2300.

Zhang B. et al., "Improved rate capability of carboncoated Li3.9Sn0.1Ti5O12 porous electrodes for Li-ion batteries", Journal of Power Sources (2011) vol. 196, pp. 10692-10697.

Zhang J. et al., Flexible and ion-conducting membrane electrolytes for solid-state lithium batteries : Dispersions of garnet nanoparticles in insulating POE » , NanoEnergy (2016) vol. 28, p. 447-454.

Zhao H. et al., "Structural and electrochemical characteristics of Li4-xAlxTi5O12 as anode material for lithium-ion batteries", Electrochimica Acta (2008) vol. 53 pp. 7079-7083.

Zhao Z. et al., "Synthesis and electrochemical performance of F-doped Li4Ti5O12 for lithium-ion batteries", Electrochimica Acta(2013) vol. 109 pp. 645-650.

Zhu Y.R. et al., "Increased cycling stability of Li4Ti5O12-coated LiMn1.5Ni0.5O4 as cathode material for lithium-ion batteries", Ceramics International (2013) vol. 39 pp. 3087-3094.

Zhu. G-N. et al., "Carbon-coated nano-sized Li4Ti5O12 nanoporous micro-sphere as anode material for high-rate lithium-ion batteries", Energy Environ. Sci., (2011) vol. 4, pp. 4016-4022.

Fan X. et al., "High energy-density and reversibility of iron fluoride cathode enabled via an intercalation extrusion reaction", Nature Communications (2018) vol. 9 Article No. 2324 (DOI: 10.1038/s41467-018-04476-2).

Grinis L. et al., "Electrophoretic deposition and compression of titania nanoparticle films for dye-sensitized solar cells", Journal of Photochemistry and Photobiology A: Chemistry (2008) vol. 198 pp. 52-59.

Han J.T. et al., "3-V Full Cell Performance of Anode Framework TiNb2O7/Spinel LiNi0.5Mn1.5O4", Chemistry of materials, (2011) vol. 23 pp. 3404-3407.

Liu J. et al., "Elegant design of electrode and electrode/electrolyte interface in lithium-ion batteries by atomic layer deposition", Nanotechnology (2015) vol. 26 Article No. 024001.

Mishra A. et al., "Electrode materials for lithium-ion batteries" Materials Science for Energy Technologies (2018) vol. 1 pp. 182-187.

Newman J., "Optimization of Porosity and Thicknes of a battery electrode by means of a reaction-zone model", J. Electrochem Soc. (1995) vol. 142 (1), pp. 97-101.

Raistrick I.D. et al., "Ionic Conductivity of Some Lithium Silicates and Aluminosilicates", J. Electrochem. Soc.: Electrochemical Science and Technology, Mathematical Model of Li-H20 Power Cell (1976) vol. 123, No. I0 pp. 1469-1476.

Zhang H. et al., "Lithiophilic-lithiophobic gradient interfacial layer for a highly stable lithium metal anode", Nature Communications (2018) vol. 9 Article No. 3729 (DOI: 10.1038/s41467-018-06126-z).

Zhu Y. et al., "Origin of outstanding stability in the lithium solid electrolyte materials : insights from thermodynamics analyses based on first principles calculations", ACS Appl. Mater. Interfaces (2015) vol. 7, pp. 23685-23693.

Supplementary search report received in CN application No. 201980085989, Mailed on Apr. 12, 2024, pp. 2.

* cited by examiner

[Fig. 1]
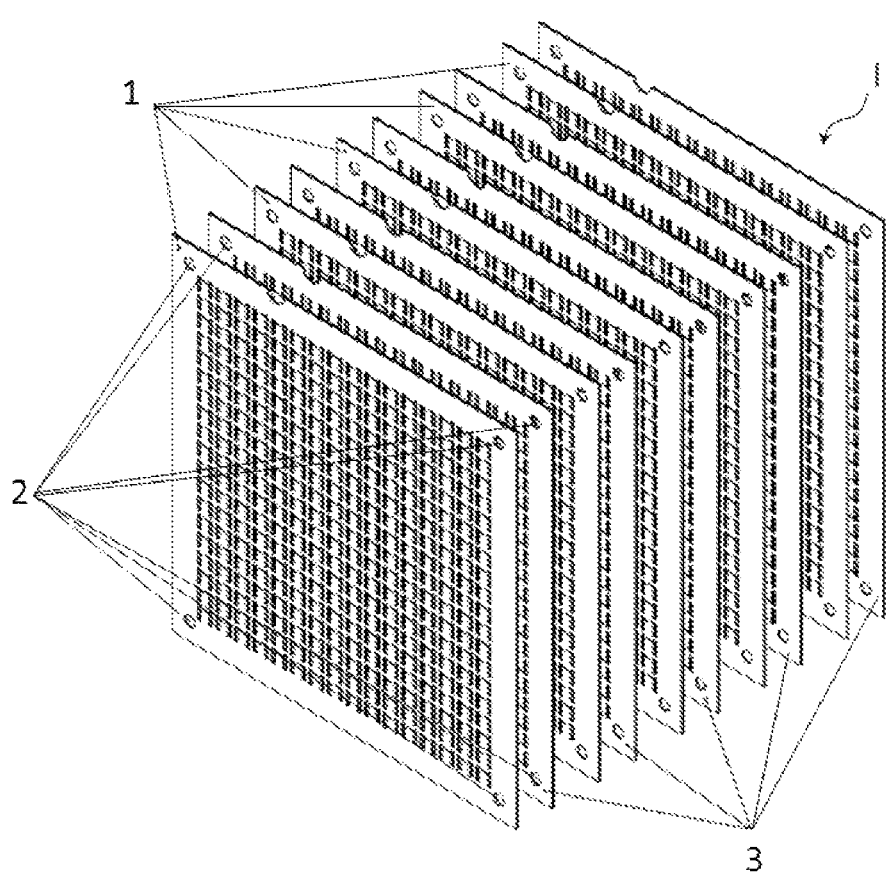

[Fig. 2]
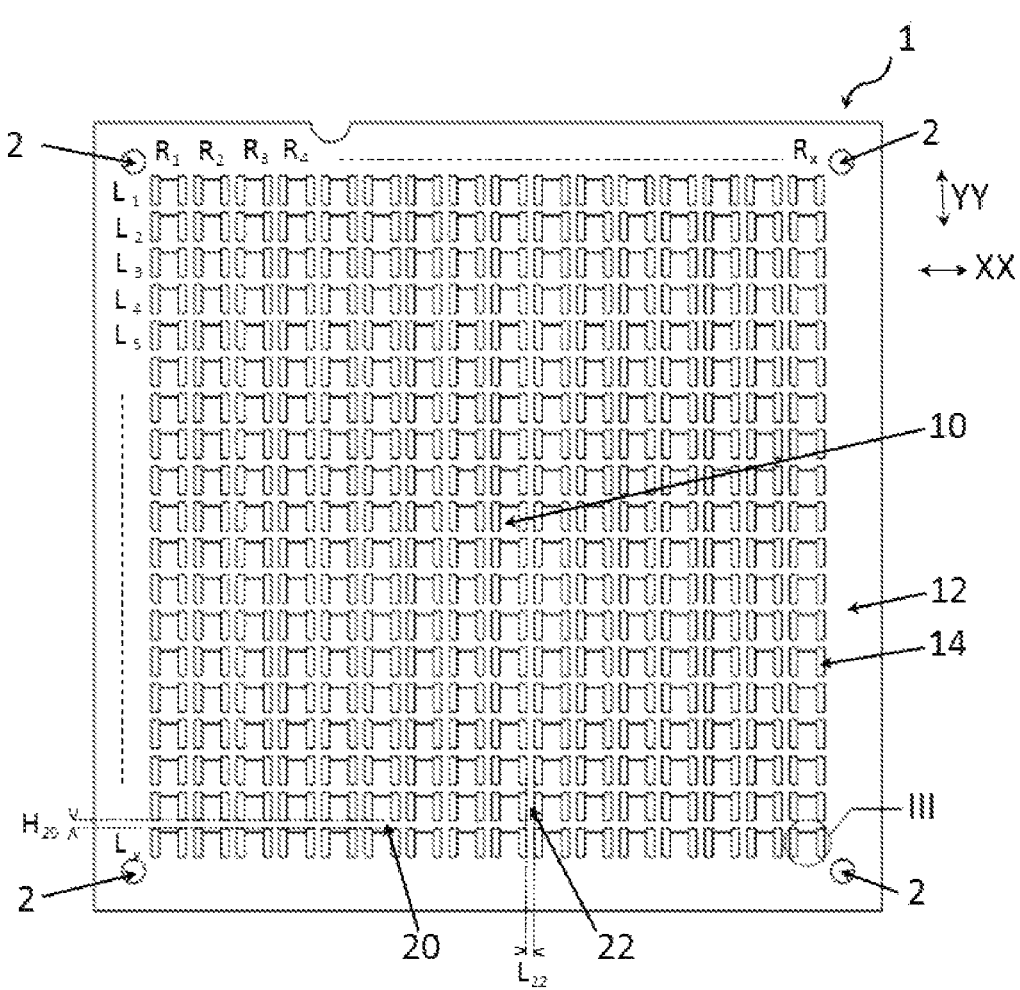

[Fig. 3]
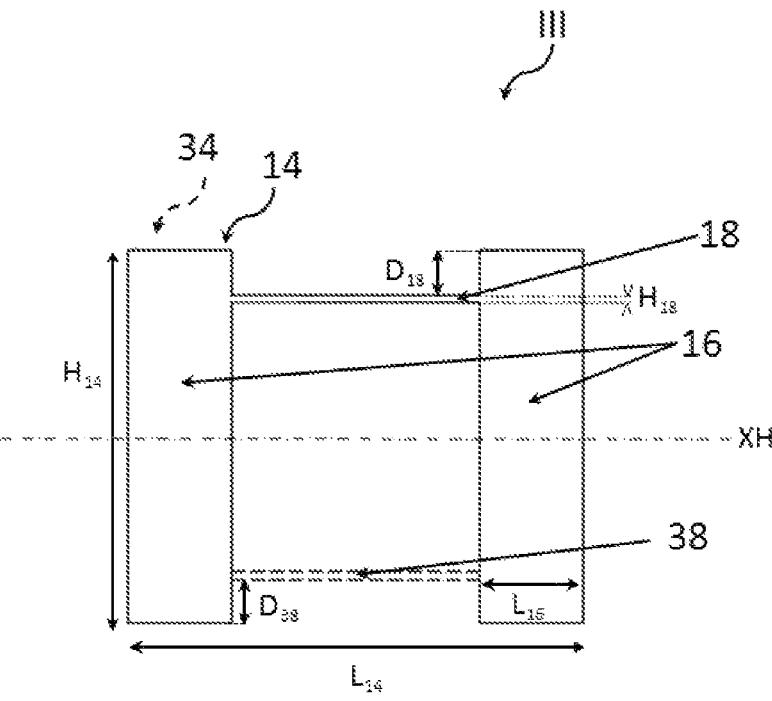
[Fig. 4]
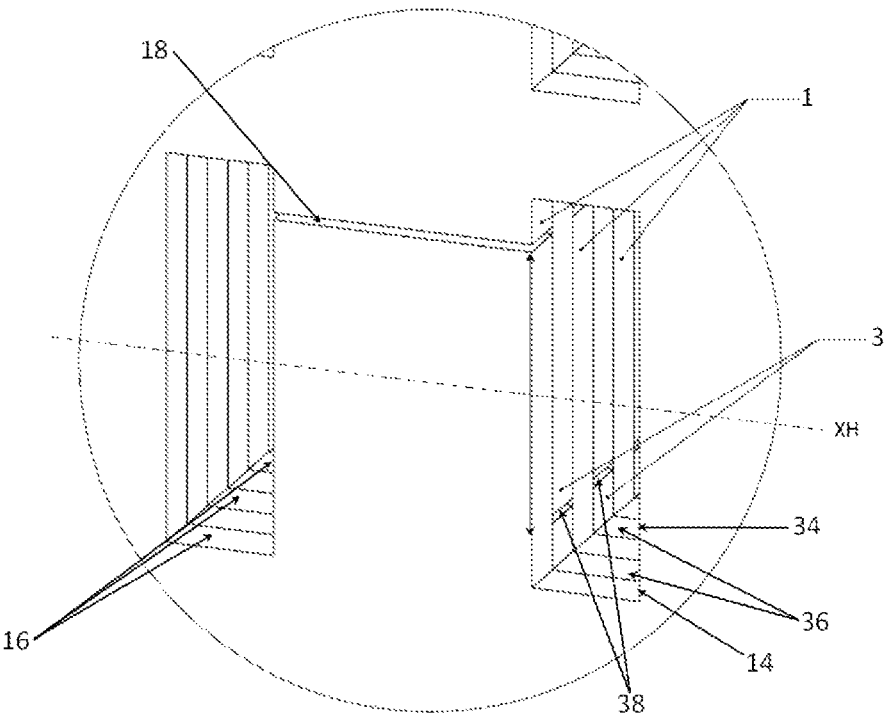

[Fig. 5]
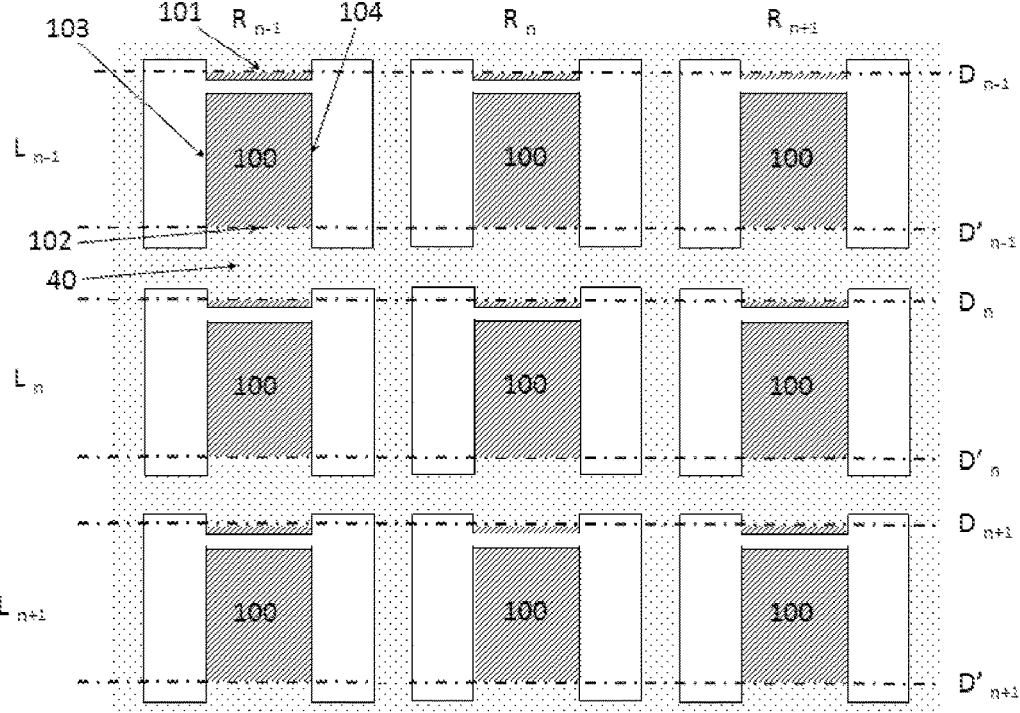
[Fig. 6]
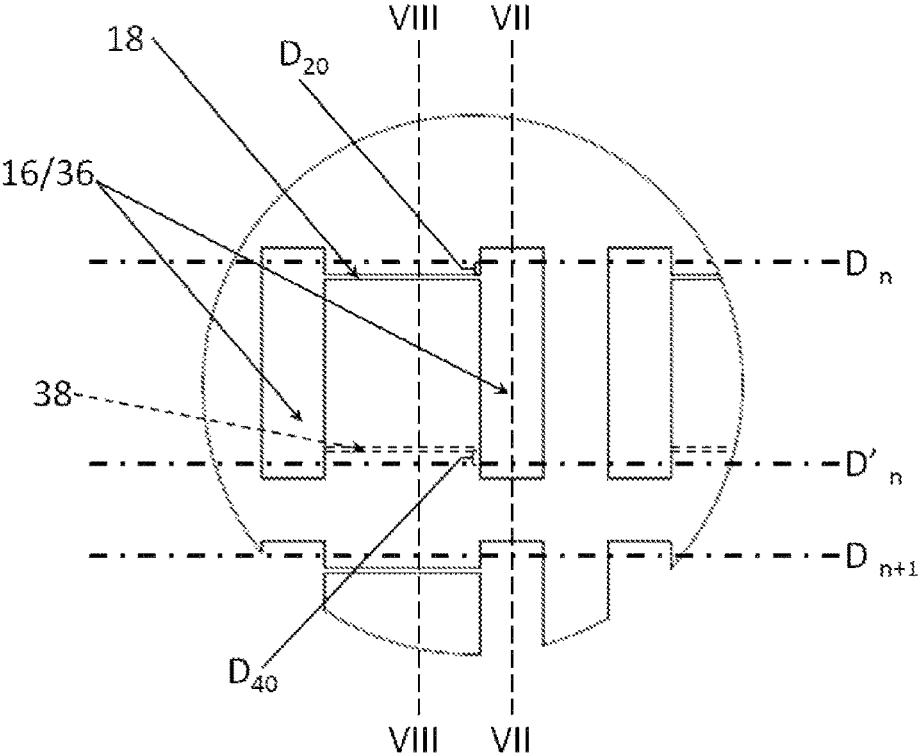

[Fig. 7]
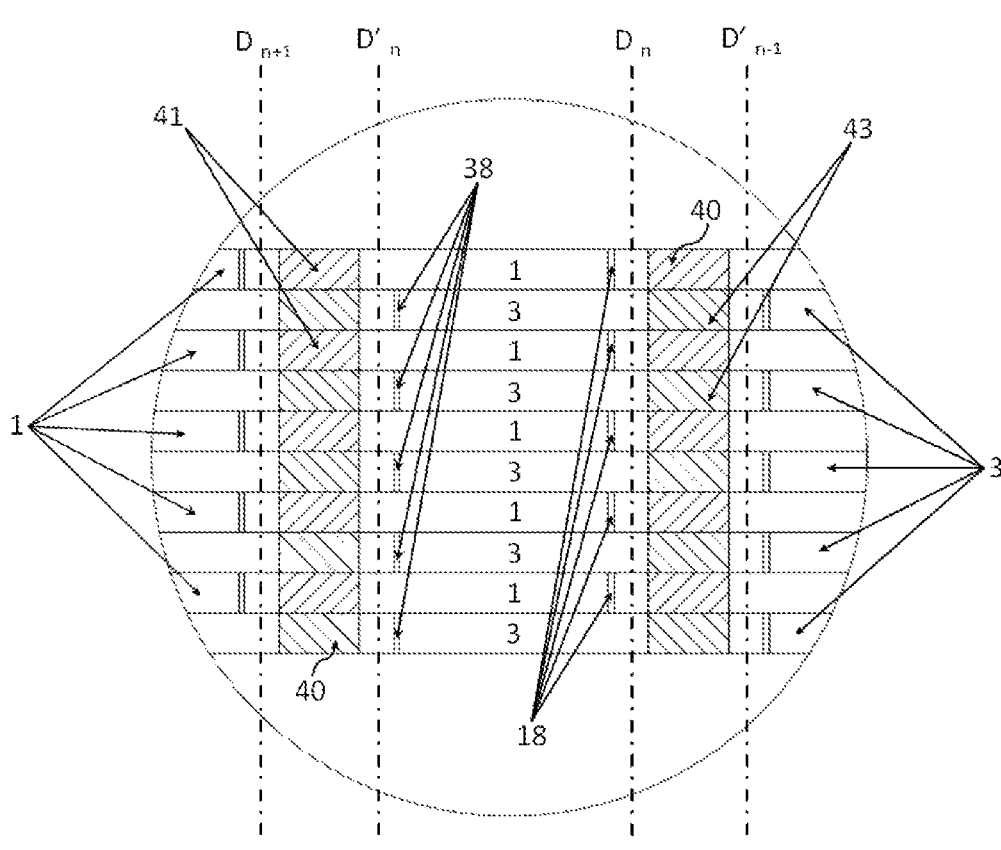

[Fig. 8]
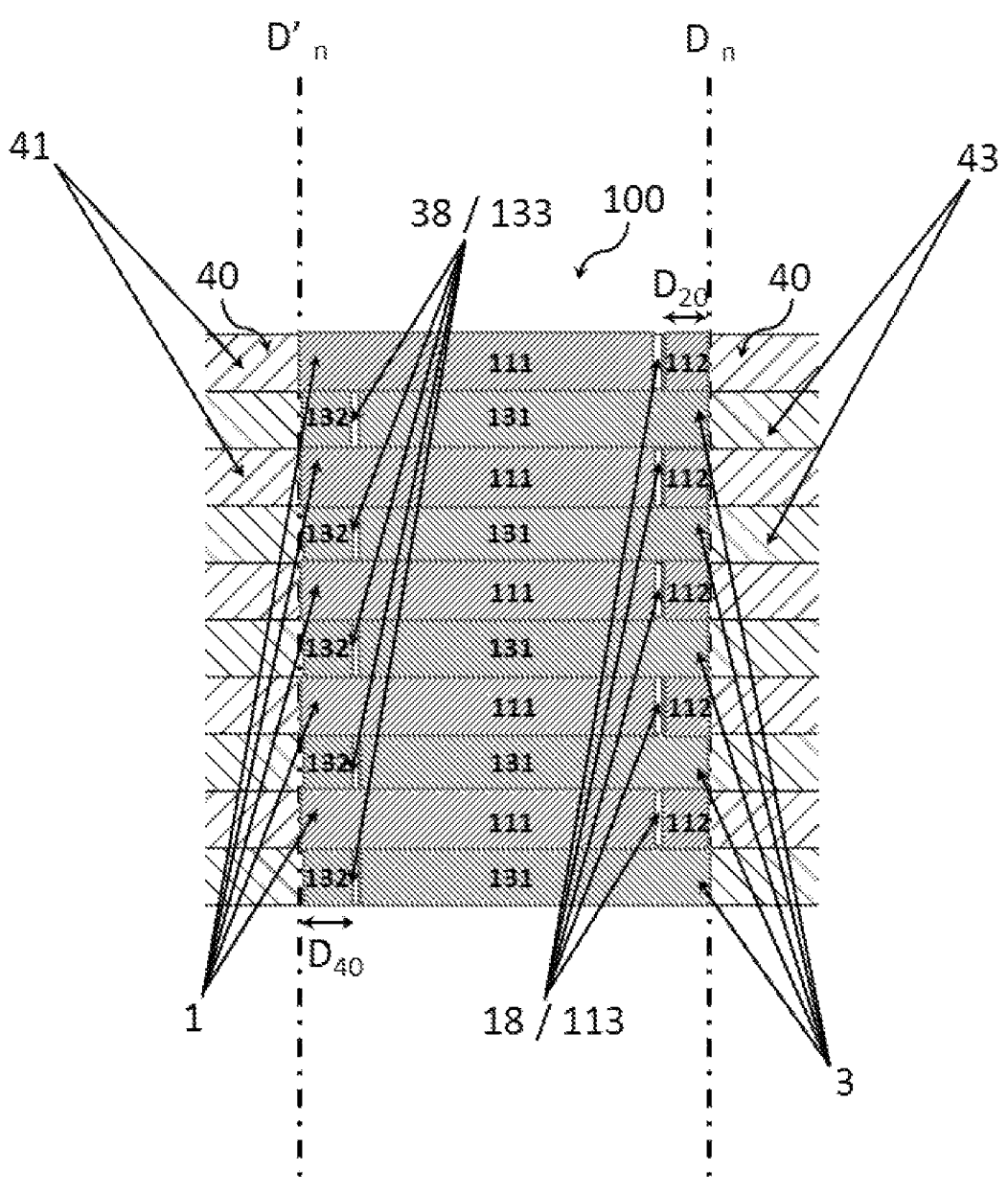

[Fig. 9]
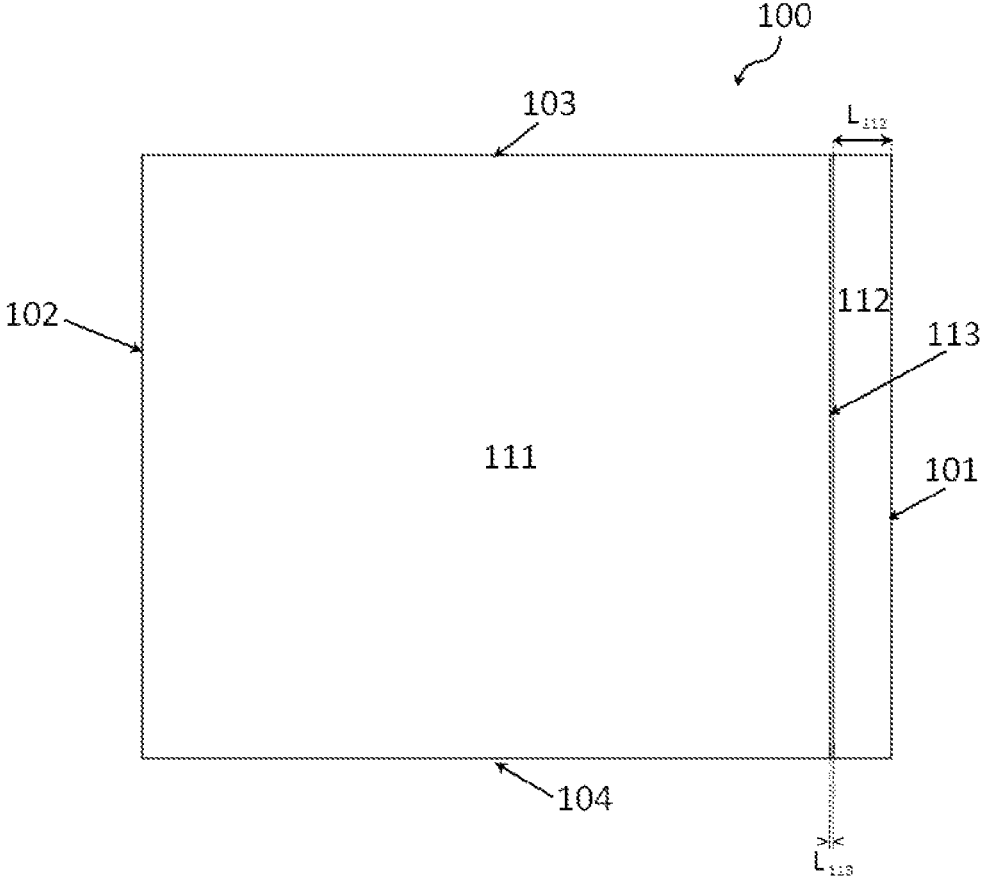
[Fig. 10]

[Fig. 11]
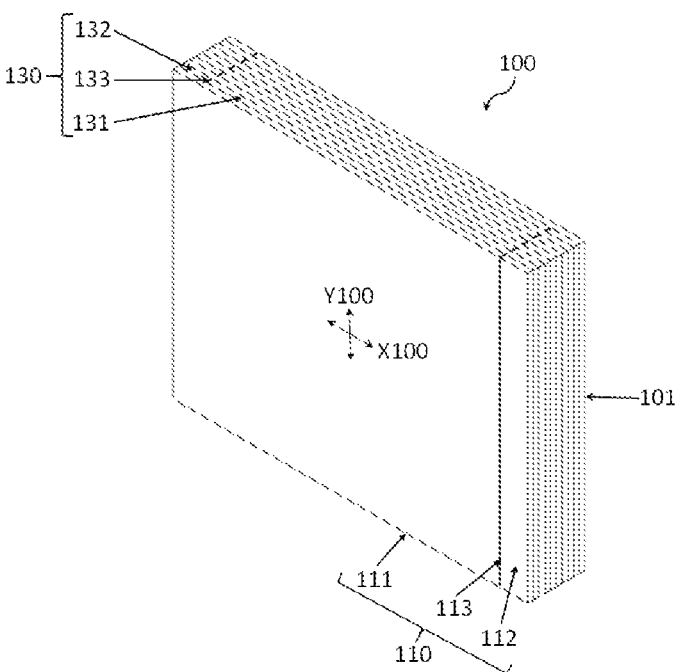
[Fig. 12]
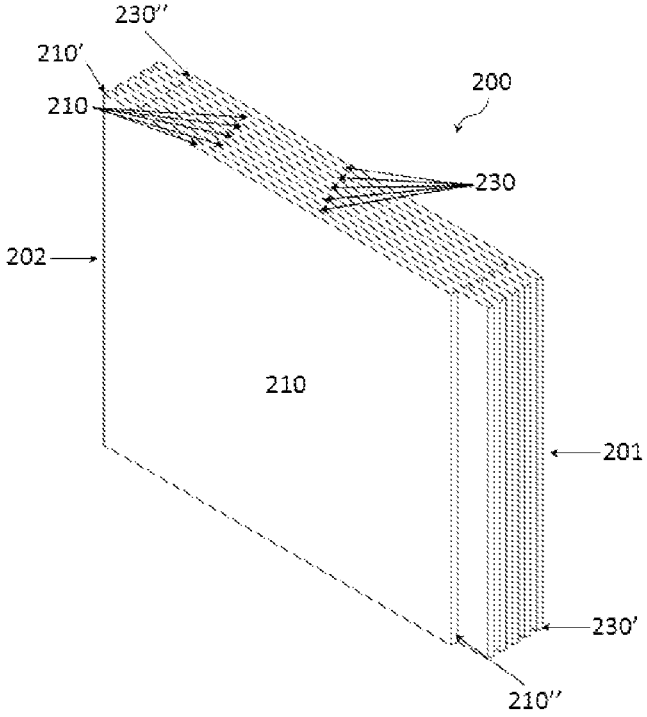

[Fig. 13]
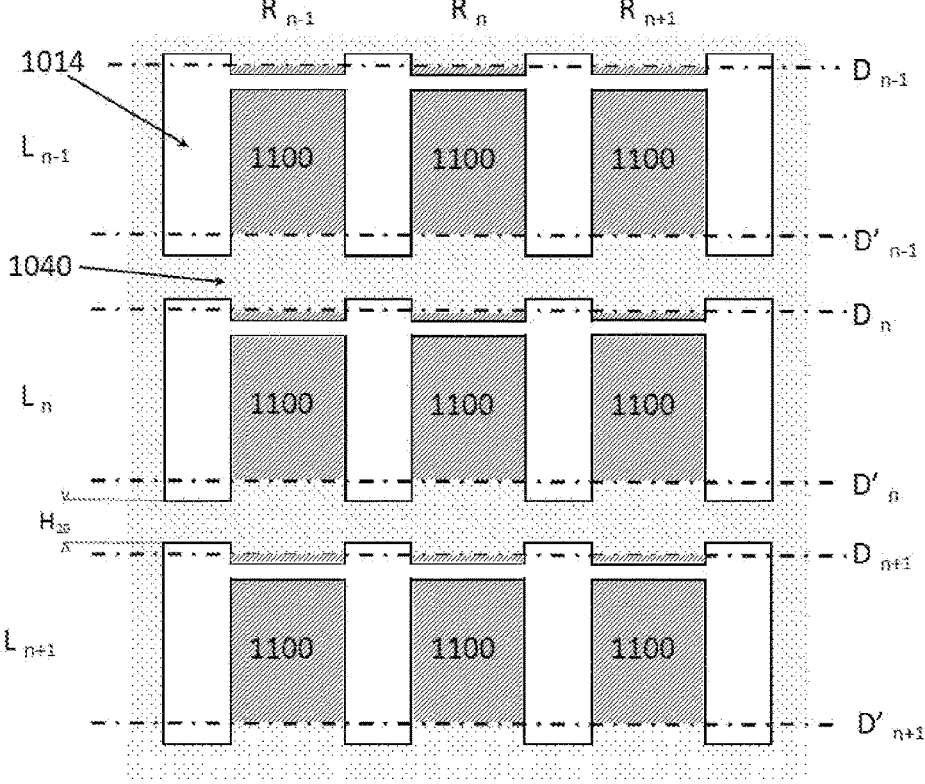
[Fig. 14]
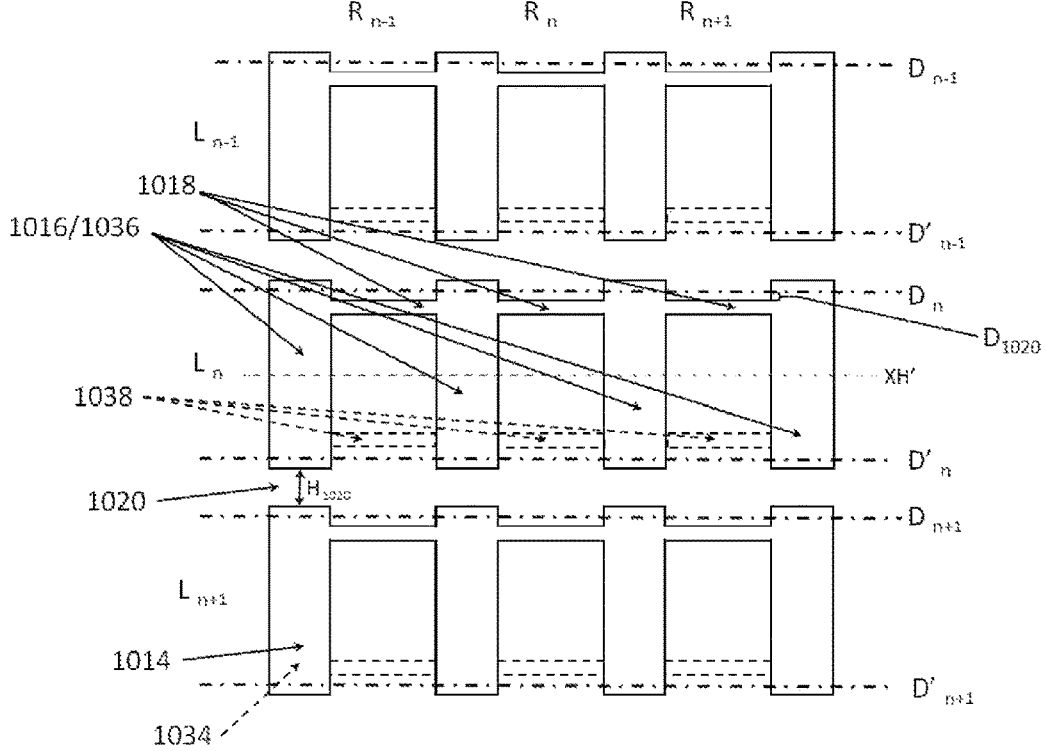

[Fig. 15]
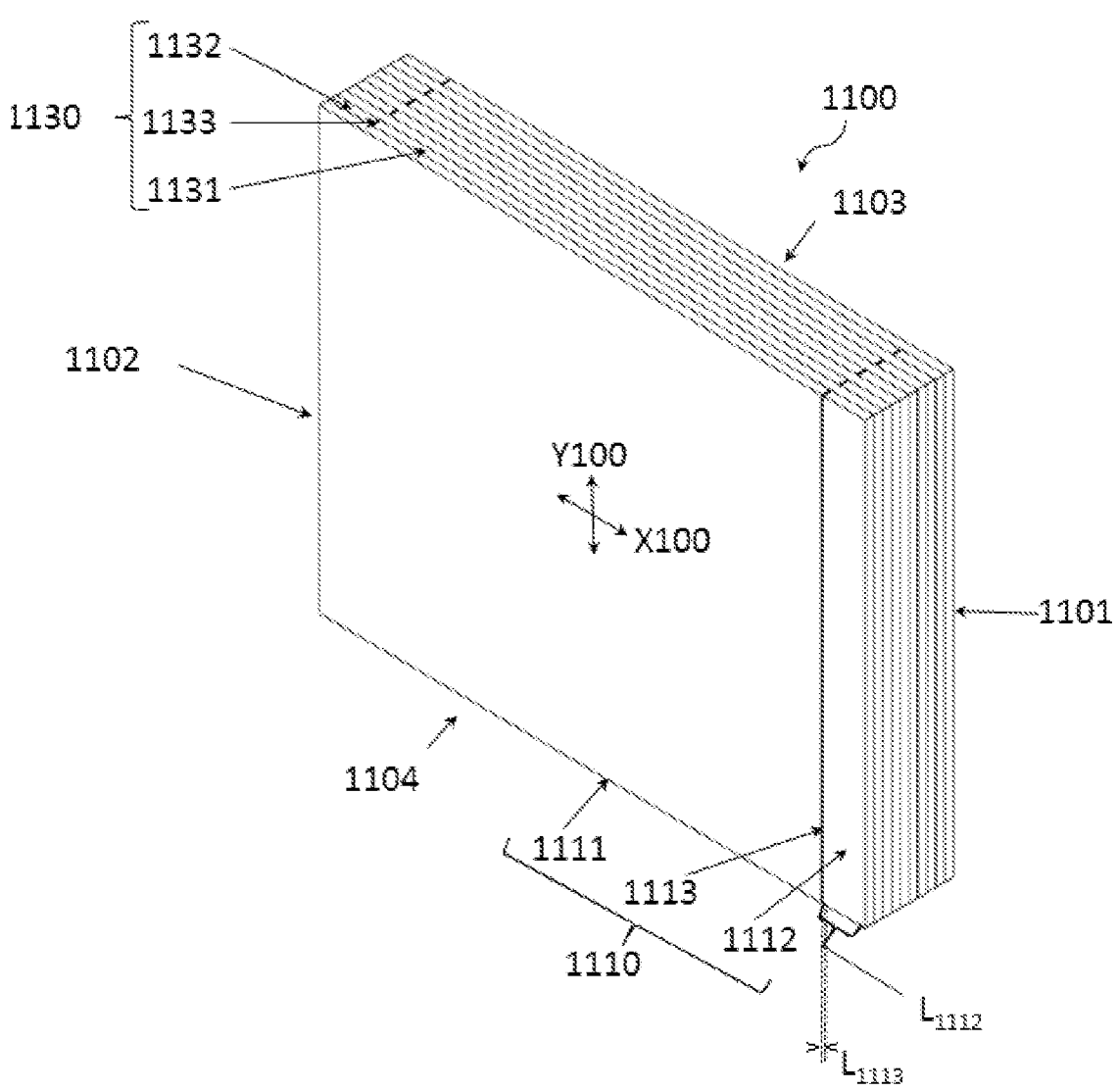

METHOD FOR MANUFACTURING BATTERIES AND BATTERY OBTAINED BY SAID METHOD

The application is a national stage of application of PCT-application number PCT/FR2019/000220 filed Dec. 24, 2019, which claims a priority to French application no FR1874096 filed in France on Dec. 24, 2018, the disclosure of which are incorporated in their entirety by reference herein.

TECHNICAL FIELD OF THE INVENTION

The present invention relates to the manufacture of batteries. It can be applied in particular to lithium ion batteries. The invention relates to a novel method for manufacturing batteries, and in particular lithium ion batteries. It also relates to the batteries obtained by this method, which have a novel architecture that confers on them an improved service life.

PRIOR ART

In order to increase the efficiency of production of rechargeable batteries with high energy density and high power density, such as entirely solid batteries or batteries impregnated with a liquid electrolyte, the simultaneous manufacture of a plurality of batteries can be implemented using a superimposition of alternating anode and cathode sheets previously coated with a layer of electrolyte.

WO 2016/001584 (I/TEN) describes sheets comprising a conductive substrate covered successively with a layer of electrode covered with a layer of electrolyte; these sheets are cut, before or after deposition, in patterns, in particular in a U shape. These sheets are stacked in alternation in order to constitute a stack of a plurality of elementary cells. The patterns of cutting of anodes and cathodes are placed in an "opposite orientations" configuration so that the stack of layers of cathode and anode are offset laterally. After the stacking step, this document teaches depositing an encapsulation system in a thick layer of around ten microns and conformal, typically a polymeric layer, on the stack and in the available cavities present within the stack. This makes it possible to ensure firstly the rigidity of the structure at the cutting planes and secondly the protection of the battery cell with regard to the atmosphere. Once the stack is produced and encapsulated in a rigid structure, it is cut along cutting planes in order to obtain unitary batteries, with the baring on each of the cutting planes of the cathode and anode connections of the batteries. It may happen that, during such cutting, the encapsulation system may be torn away, which causes discontinuity of the impermeability of the battery. Adding terminations (i.e. electrical contacts) at the point where these cathode and anode connections are visible is also known.

This prior art is explained here in greater detail with reference to FIG. 12, which illustrates a lithium ion battery structure described in WO 2016/001584. The battery 200 comprises a plurality of anodes 230 and a plurality of cathodes 210, which are disposed one above the other in alternation. Each anode and each cathode comprises a layer of a respective anode or cathode active material, referred to as the anode layer and respectively the cathode layer. Moreover, a layer of an electrolyte material, not shown in FIG. 12, is interposed between the anode and the cathode, so that the electrolyte material separates two facing active materials. The thickness of the various layers that constitute them does not normally exceed 10 μm, and is often between 1 μm and 4 μm. The battery has, on a first lateral edge 201, anode connections 230' located below one another. Moreover, on the opposite lateral edge 202, cathode connections 210' located below one another are provided. The stack of anodes 230 and cathodes 210 is offset laterally. The cathode connections 210' are located projecting, with respect to the free face 230" of the anode. In a similar manner, on the opposite edge 201, the free face 210" of the cathode is located recessed with respect to the free face of the anode, on which anode connections 230' are subsequently deposited.

This known solution does however have certain drawbacks. This is because, according to the positioning of the electrodes, in particular the proximity of the edges of the electrodes for multilayer batteries and the cleanness of the cuts, a leakage current may appear on the ends, typically in the form of a rampant short-circuit. It reduces the performance of the battery, and this despite the use of an encapsulation system around the battery and in the vicinity of the cathode and anode connections. Moreover, an unsatisfactory deposition of the encapsulation system on the battery is sometimes found, in particular on the edges of the battery at the spaces created by the lateral offsets of the electrodes on the battery edges.

Moreover, since the terminations, respectively anode and cathode, are situated recessed from the adjacent layers, respectively cathode and anode, it is necessary to make a cutout of large dimensions. Such a cutout must then be filled by means of an insulating material. Given the large dimensions thereof, this cutout leads to a substantial loss of useful materials, for producing the battery proper. Moreover, it makes it necessary to deposit great thicknesses of insulator, in the available cavities present within the stack. A thick insulator risks weakening the whole of the battery encapsulation system since, during the cutting, the encapsulation system deposited in a thick layer has a tendency to delaminate.

The architecture according to the prior art therefore has both technical and economic drawbacks.

The present invention aims at least partly to remedy some drawbacks of the prior art mentioned above.

It aims in particular to increase the efficiency of production of rechargeable batteries with high energy density and high power density and to produce more efficient encapsulations at less cost.

It aims in particular to propose a method that reduces the risk of short-circuit, and which makes it possible to manufacture a battery having low self-discharge.

It aims in particular to propose a method that makes it possible to manufacture, in a simple, reliable and rapid manner, a battery having a very long service life.

It also aims to propose such a method that uses a cutting step of better quality than in the prior art.

It also aims to propose such a method that makes it possible to improve the encapsulation phases and the encapsulation itself, taking place during the production of the end battery.

It also aims to propose a method for manufacturing batteries that causes less loss of materials.

OBJECTS OF THE INVENTION

At least one of the above objectives is achieved by means of at least one of the objects according to the invention as presented below. The present invention proposes as a first object a battery comprising at least one anode and at least one cathode, arranged on top of one another in an alternating manner, said battery comprising lateral edges comprising an anode connection area and a cathode connection area, preferably laterally opposite the anode connection area, and longitudinal edges, in which the anode comprises a current collector substrate, at least one anode layer, and optionally a layer of an electrolyte material or of a separator impregnated with an electrolyte, and the cathode comprises a current collector substrate, at least one cathode layer, and optionally a layer of an electrolyte material or of a separator impregnated with an electrolyte, so that the battery comprises successively at least one anode layer, at least one layer of an electrolyte material or of a separator impregnated with an electrolyte and at least one cathode layer, characterized in that each anode and each cathode comprises a respective main body, separated from a respective secondary body, said main bodies and secondary bodies being separated by a space free from any electrode material, electrolyte and/or current-collector substrate, said free space connecting the opposite longitudinal edges of the battery, i.e. said free space extending between the opposite longitudinal edges of the battery.

The present invention proposes as a second object a battery comprising at least one anode and at least one cathode, arranged on top of one another in an alternating manner, said battery comprising lateral edges comprising an anode connection area and a cathode connection area, preferably laterally opposite the anode connection area, and longitudinal edges, in which the anode comprises a current collector substrate, at least one anode layer, and optionally a layer of an electrolyte material or of a separator impregnated with an electrolyte, and the cathode comprises a current collector substrate, at least one cathode layer, and optionally a layer of an electrolyte material or of a separator impregnated with an electrolyte, so that the battery comprises successively at least one anode layer, at least one layer of an electrolyte material or of a separator impregnated with an electrolyte and at least one cathode layer, characterized in that each anode and each cathode comprises a respective main body, separated from a respective secondary body by a space free from any electrode material, electrolyte and/or current-collector substrate, said free space connecting the opposite longitudinal edges of the battery, i.e. said free space extending between the opposite longitudinal edges of the battery.

Advantageously, the battery comprises an encapsulation system completely covering four of the six faces of said battery, the remaining two faces comprising an anode connection area and a cathode connection area.

Advantageously, the encapsulation system comprises:

at least one first covering layer, preferably selected from parylene, type-F parylene, polyimide, epoxy resins, silicone, polyamide, sol-gel silica, organic silica and/or a mixture thereof, deposited on the battery, at least one second covering layer composed of an electrically insulating material, deposited by deposition of atomic layers on said at least one first covering layer, on the understanding that this sequence of at least one first covering layer and of at least one second covering layer may be repeated z times with z≥1.

Advantageously, the anode connection area and the cathode connection area are covered by a termination system.

Advantageously, the termination system comprises successively:

a first layer of a material filled with graphite, preferably based on an epoxy resin filled with graphite, a second dense layer of metallic copper arranged on the first layer of the termination system, and optionally, a third layer based on a tin-zinc alloy of tin, arranged on the second layer, optionally a fourth layer based on tin or based on an alloy of silver, palladium and copper, arranged on the third layer of the termination system.

Advantageously, the width of the free space is between 0.01 mm and 0.5 mm.

Advantageously, the width of the secondary bodies is between 0.05 mm and 2 mm.

Advantageously, in plan view, the free spaces of the cathodes are superimposed.

Advantageously, in plan view, the free spaces of the anodes are superimposed.

Advantageously, in plan view, the free spaces of the cathodes and of the anodes are not coincident.

Another object of the invention is a method for manufacturing a battery, said battery comprising at least one anode and at least one cathode, arranged on top of one another in an alternating manner, said battery comprising longitudinal edges and lateral edges, wherein the anode comprises a current collector substrate, at least one cathode layer, and optionally a layer of an electrolyte material or of a separator impregnated with an electrolyte, and the cathode comprises a current collector substrate, at least one cathode layer, and optionally a layer of an electrolyte material or of a separator impregnated with an electrolyte, so that the battery comprises successively at least one anode layer, at least one layer of an electrolyte material or of a separator impregnated with an electrolyte, and at least one cathode layer, each anode comprising an anode connection area, located in the vicinity of a first lateral edge of the battery, whereas each cathode comprises a cathode connection area, located on a second lateral edge of the battery, opposite to said first edge, said manufacturing method comprising:

a) the provision of a stack of alternating sheets, this stack comprising first sheets or anode sheets, each of which is intended to form an anode layer of a plurality of batteries, as well as second sheets or cathode sheets, each of which is intended to form a cathode layer of a plurality of batteries, each anode sheet comprising at least one anode slot and each cathode sheet comprising at least one cathode slot, said slot, respectively anode and cathode, comprising two longitudinal parts at least partly superimposed, intended to delimit the longitudinal edges of the battery, as well as a lateral part connecting said two longitudinal parts, i.e. a lateral part extending between the two longitudinal parts of said slot, the lateral part of the anode slot and the lateral part of the cathode slot being mutually offset, it being understood that each lateral part of the slots delimits a space free from any electrode material, electrolyte and current-collector substrate, said free space separating, for each anode and each cathode, a main body from a secondary body, i.e. a main body with respect to a secondary body, b) the implementation of a heat treatment and/or of a mechanical compression of the stack of alternating sheets previously provided, c) the production of two cutouts extending at least partially inside said slots, the first cutout extending between the lateral part of the anode slot and the facing end of the longitudinal parts, whereas the second cutout extends between the lateral part of the cathode slot and the facing end of the longitudinal parts.

Advantageously, after the step c), the cut-out stack is encapsulated, by depositing:

at least one first covering layer, preferably selected from parylene, type-F parylene, polyimide, epoxy resins, silicone, polyamide, sol-gel silica, organic silica and/or a mixture thereof, deposited on the battery, at least one second covering layer composed of an electrically insulating material, deposited by deposition of atomic layers on said at least one first covering layer, on the understanding that this sequence of at least one first covering layer and of at least one second covering layer may be repeated z times with z≥1.

Advantageously, after the step d) of encapsulating the cut-out stack, the cut-out and encapsulated stack is impregnated, by a phase carrying lithium ions such as liquid electrolytes or an ionic liquid containing lithium salts.

Advantageously the terminations of the battery are produced by successively depositing a first layer of a material filled with graphite, preferably based on an epoxy resin filled with graphite, a second dense layer of metallic copper arranged on the first layer of the termination system, and optionally, a third layer based on a tin-zinc alloy of tin, arranged on the second layer of the termination system, optionally a fourth layer based on tin or based on an alloy of silver, palladium and copper, arranged on the third layer of the termination system.

Advantageously, the two cutouts are produced through at least a majority of the anodes and cathodes, in particular through all the anodes and cathodes.

Advantageously, the distances between each cutout and the facing ends of the longitudinal parts are identical. Advantageously, its distances are between 0.05 mm and 2 mm.

Advantageously, each slot has a roughly H shape, the longitudinal parts forming the vertical main recesses of the H, whereas the lateral part forms the channel of the H.

Advantageously, each lateral part of the slots delimits a space free from any electrode material, electrolyte and/or current-collector substrate connecting or extending between the opposite longitudinal edges of the battery, said free space separating, for each anode and each cathode, a main body from a secondary body.

Advantageously, the width of the lateral part of the slots is between 0.05 mm and 2 mm.

Advantageously, each sheet belonging to said stack comprises a plurality of lines of slots arranged alongside each other. Advantageously, the two cutouts are made through all the slots on the same line.

Advantageously, each sheet comprises a plurality of rows of slots arranged below one another.

Advantageously, the distance separating adjacent cutouts, provided in adjoining lines, is between 0.05 mm and 5 mm.

Advantageously, the number of lines is between 10 and 500, whereas the number of rows is between 10 and 500.

Advantageously, each cutout is produced by a sawing method, by a swaging method, by guillotine, or by laser.

FIGURES

The accompanying figures, given by way of non-limitative examples, show various aspects and embodiments of the invention. [FIG. 12] shows a battery according to the prior art.

FIG. 1 is a perspective view of the anode and cathode sheets intended to form a stack according to the battery manufacturing method in accordance with the invention.

FIG. 2 is a front view, illustrating one of the sheets of FIG. 1.

FIG. 3 is a front view, to a larger scale, illustrating the H-shaped slots formed in adjacent sheets.

FIG. 4 is a perspective view, also to a large scale, illustrating these H-shaped slots formed in adjacent sheets.

FIG. 5 is a plan view, illustrating a cutting step performed on various slots formed in the stack in the previous figures.

FIG. 6 is a plan view, illustrating to a larger scale the cutouts formed on an H-shaped slot.

FIG. 7 is a view in cross section, along the line VII-VII indicated in FIG. 6.

FIG. 8 is a view in cross section along the line VIII-VIII indicated in FIG. 6.

FIG. 9 is a plan view illustrating a battery according to the invention, which is able to be obtained in particular according to the method of the previous figures.

FIG. 10 is a front view illustrating a battery according to the invention that is able to be obtained in particular according to the method of the previous figures.

FIG. 11 is a perspective view illustrating a battery according to the invention that is able to be obtained in particular according to the method of the preceding figures.

FIG. 12 is a perspective view illustrating a battery according to the prior art.

FIG. 13 is a plan view illustrating a cutting step implemented on various H-shaped slots formed on an anode sheet or cathode sheet according to a second variant of the invention.

FIG. 14 is a plan view illustrating to a larger scale the cutouts formed on H-shaped slots according to a second variant of the invention.

FIG. 15 is a perspective view illustrating a battery according to the invention that is able to be obtained in particular according to the second variant of the invention.

The following references are used on these figures and in the following description:

TABLE 1

| references used in the present application | | | |
|---|---|---|---|
| I | stack of anode and cathode sheets | | |
| 1 | cathode sheet | XH/XH$^1$ | horizontal median axis of slots 14 and 34, and respectively of slots 1014 and 1034 |
| 3 | anode sheet | D, D', D$_n$, D'$_n$, D$_{n+1}$, D'$_{n+1}$ | Cutout |

TABLE 1-continued

| references used in the present application | | | |
|---|---|---|---|
| 10 | perforated central area of the cathode sheet | 100/ 1100 | Battery according to the invention |
| 12 | peripheral frame of the cathode sheet | 40/1040 | off-cuts of material |
| XX | longitudinal or horizontal direction of the stack | 41 | off-cuts of cathode materials |
| YY | vertical or transverse direction of the stack | 43 | off-cuts of anode materials |
| L | line of slots | X 100 Y 100 | longitudinal and transverse median axes of 100 |
| R | row of slots | 101/102 | lateral edges of 100 |
| 20/ 1020 | bridges of material between two lines | 103/104 | longitudinal edges of 100 |
| $H_{20}$/ $H_{1020}$ | heights of the bridges | 110/ 1110 | cathode layers |
| 22 | bands of materials between two rows | 130/ 1130 | anode layers |
| $L_{22}$ | width of strips | 111, 131/ 1111, 1131 | main body of 110, respectively of 130/main body of 1110, respectively of 1130 |
| 14/ 1014 | H-shaped slots in the cathode sheets | 112, 132/ 1112, 1132 | secondary body of 110, respectively of 130/secondary body of 1110, respectively of 1130 |
| 16/ 1016 | vertical main recesses of 14 | 113/ 1113 | Space, between 111 and 112, respectively between 1111 and 1112, free from any electrode material, electrolyte and/or current collector substrate |
| 18/ 1018 | horizontal channel of 14 | 133/ 1133 | space, between 131 and 132, respectively between 1131 and 1132, free from any electrode material, electrolyte and/or current collector substrate |
| $H_{14}$ | total height of the slot | $L_{113}$/ $L_{1113}$ | width of the free space between 111 and 112, respectively between 1111 and 1112 |
| $L_{14}$ | total width of the slot | $L_{112}$/$L_{1112}$ | width of secondary body 112, respectively 1112 |
| $L_{16}$ | width of each main recess 16 | 111', 112', 131', 132' | free spaces respectively of 111, 112, 131, 132 |
| $H_{18}$ | height of each channel 18 | 200 | batteries of the prior art, see FIG. 12 |
| $D_{18}$ | distance between the top of 16 and 18 | 210/230 | cathode/anode |
| 34/ 1034 | H-shaped slots in the anode sheets, similar to the slots 14/1014 | 201/202 | lateral edges |
| 36/ 1036 | vertical main recesses of 34 | 210'/ 230' | free faces of the cathode/of the anode |
| 1101/ 1102 | lateral edges of 1100 | 210"/ 230" | free faces of the cathode/of the anode located recessed |
| 38/ 1038 | horizontal channel of 34 | $D_{20}$ | distance between the cutout Dn and the opposite face of the channel 18 |
| 2 | Perforations present at the four ends of the anode and cathode sheets | $D_{40}$ | distance between the cutout D'n and the opposite face of the channel 38 |
| $D_{1020}$ | distance between the cutout Dn and the opposite face of the channel 1018 | $D_{38}$ | distance between the top of 36 and of 38 |

DESCRIPTION OF THE INVENTION

The method according to the invention comprises first of all a step wherein a stack I of alternating sheets, these sheets being hereinafter called, according to the case, "anode sheets" and "cathode sheets". As will be seen in more detail by each anode sheet is intended to form the anode of a plurality of batteries, and each cathode sheet is intended to form the cathode of a plurality of batteries. In the example illustrated in FIG. 1, five cathode sheets 1 are shown, as well as five anode sheets 3. In practice, this stack is formed by a greater number of sheets, typically between ten and one thousand. In an advantageous embodiment, all these sheets have perforations 2 at the four ends thereof so that, when these perforations 2 are superimposed, all the cathodes and all the anodes of these sheets are arranged specifically, as will be explained in greater detail below (cf. FIGS. 1 and 2). These perforations 2 at the four ends of the sheets may be produced by any suitable means, in particular on anode and cathode sheets after fabrication or on anode and/or cathode sheets covered with a layer of electrolyte or covered with a separator so that this layer of electrolyte or this separator are interposed between two sheets of opposite polarity, i.e. between the anode sheet and the cathode sheet.

The physical and chemical structure of each anode or cathode sheet, which may be of a known type, does not form part of the invention and will be described only succinctly. Each anode and respectively cathode sheet comprises an active anode layer and respectively an active cathode layer. Each of these active layers may be solid, i.e. with a dense or porous nature. Moreover, in order to avoid any electrical contact between two adjacent sheets, a layer of electrolyte or a separator impregnated with a liquid electrolyte is disposed on at least one of these two sheets, in contact with the opposite sheet. The layer of electrolyte or the separator impregnated with a liquid electrolyte, not shown in the figures describing the present invention, is interposed between two sheets of opposite polarity, i.e. between the anode sheet and the cathode sheet.

The mechanical structure of one of the cathode sheets 1 will now be described, on the understanding that the other cathode sheets have an identical structure. Moreover, as will be seen hereinafter, the anode sheets 3 have a structure very similar to that of the cathode sheets 1.

As can be seen in FIG. 2, the cathode sheet 1 has a quadrilateral shape, substantially of the square type. It delimits a so-called perforated central area 10, in which H-shaped slots are formed, which will be described below. With reference to the positioning of these H-shaped slots, a so-called vertical direction YY of the sheet is defined, which corresponds to the vertical direction of these Hs, and a so-called horizontal direction XX of the sheet, perpendicular to the direction YY. The central area 10 is bordered by a peripheral frame 12 that is solid, namely with no slots. The function of this frame is in particular to ensure easy manipulation of each sheet.

The H-shaped slots are distributed along lines $L_1$ to $L_y$, disposed one underneath the other, as well as along rows $R_1$ to $R_x$ provided alongside each other. By way of non-limitative examples, in the context of the manufacture of microbatteries of the surface mounted component type (hereinafter SMC), the anode and cathode sheets used may be plates 100 mm×100 mm. Typically, the number of lines of these sheets is between 10 and 500, whereas the number of rows is between 10 and 500. According to the required capacity of the battery, the dimensions thereof may vary and the number of lines and rows of anode and cathode sheets can be adapted accordingly. The dimensions of the anode and cathode sheets used may be modulated according to requirements. As shown in FIG. 2, two adjacent lines are separated by bridges of material 20, the height of which is denoted $H_{20}$, which is between 0.05 mm and 5 mm. Two adjacent rows are separated by strips of material, the width of which is denoted $L_{22}$, which is between 0.05 mm and 5 mm. These bridges and strips of material of the anode and cathode sheets confer thereon sufficient mechanical rigidity for them to be able to be manipulated easily.

The slots 14 are through slots, namely they emerge on respectively top and bottom faces of the sheet. The slots 14 can be produced in a manner known per se, directly on the substrate, before any deposition of anode or cathode materials by chemical etching, by electroforming, by laser cutting, by microperforation or by stamping. These slots may also be produced on substrates covered with anode or cathode materials, on anode or cathode sheets covered with a layer of electrolyte or with a separator, in a manner known per se, for example by laser cutting, by femtosecond laser cutting, by microperforation or by stamping. The slots 14, produced in all the cathodes, are superimposed as shown in particular in FIG. 3.

One of the H-shaped slots 14 will now be described, on the understanding that all the cutouts in the cathode sheet are identical. The slot 14 is formed by two vertical and parallel main recesses 16, which are connected in their top part thereof by a horizontal channel 18, preferably perpendicular to the two vertical main recesses 16. The following annotations are used:

$H_{14}$ the height of the slot assembly, which is typically between 0.25 mm and 10 mm;

$L_{14}$ the width thereof, which is typically between 0.25 mm and 10 mm;

$L_{16}$ the width of each main recess, which is typically between 0.02 mm and 5 mm;

$H_{18}$ the height of each channel, which is typically between 0.01 mm and 0.5 mm;

$D_{18}$ the difference in heights between the top of the main recesses and the top of the channel, which is typically between 0.05 mm and 2 mm.

Each anode is also provided with various lines and rows of slots 34, provided in the same number as the slots 14. As shown in particular by FIG. 4, the structure of each slot 34 is substantially similar to that of each slot 14, namely that this slot 34 comprises two vertical main recesses 36, connected by a channel 38. The dimensions of the vertical main recesses 36 are identical to those of the vertical main recesses 16 and, in a similar manner, the dimensions of the channels 38 are similar to those of the channels 18.

In plan view, the vertical main recesses 36 are superimposed with those 16. The only difference between the slots 14 and 34 lies in the fact that the channels 38 are provided in the lower part. As shown particularly in FIG. 3, the channels 18 and 38 are mutually symmetrical in plan view, with respect to the median axis of the Hs, which is denoted XH.

It is supposed that the stack described above is subjected to steps aimed at ensuring the global mechanical stability thereof. These steps, of a type known per se, include in particular the thermopressing of the various layers. As will be seen below, this stack allows the formation of individual batteries, the number of which is equal to the product between the number of lines Y and the number of rows X.

For this purpose, with reference to FIG. 5, three lines $L_{n-1}$ to $L_{n+1}$ and three rows $R_{n-1}$ to $R_{n+1}$ have been illustrated. In accordance with the invention, two cutouts $D_n$ and $D'_n$ per line of slots are produced. Each cutout, which is implemented so as to pass right through, namely it extends over the whole of the height of the stack, is produced in a manner known per se. By way of non-limitative examples, cutting by sawing will be mentioned, in particular cutting by swaging, cutting by guillotine or cutting by laser.

As shown in particular by FIG. 6, which is a view to a larger scale of one of the slots in FIG. 5, each cutout is produced between a respective channel and the facing end of the H. It is supposed that the thickness of said cutout is ignored. Under these conditions, with reference to this FIG. 6, by way of non-limitative examples, the following are noted:

the distance $D_{20}$ between the cutout $D_n$ and the opposite face of the horizontal channel 18 is between 0.05 mm and 2 mm, on the understanding that this distance $D_{20}$ is less than or equal to $D_{18}$;

the distance $D_{40}$ between the cutout $D'_n$ and the opposite face of the horizontal channel 38, between 0.05 mm and 2 mm, on the understanding that this distance $D_{40}$ is less than or equal to $D_{38}$.

With reference once against to FIG. 5, each final battery is delimited, at the top and bottom, by the two cutouts and, to the right and to the left, by the internal faces of the vertical main recesses of the H. In this FIG. 5 the batteries 100 once cut by the cutting lines $D_n$ and $D'_n$ have been hatched, and the areas 40 of the sheets of the stack, which do not form the batteries, have been illustrated by dots, whereas the volume of the slots is left blank.

FIGS. 7 and 8 are views in cross section, taken along parallel cutting lines. The cross section VII-VII extends through the vertical main recesses of the H, whereas the cross section VIII-VIII passes through the material. In FIG. 7, the regions 40 have been referenced, illustrated also in FIG. 5, which correspond to off-cuts of material, in particular off-cuts of materials of anodes 43 and of materials of cathodes 41. In FIG. 8 it is noted that the cutouts are made both through the anodes and the cathodes, namely at a distance $D_{20}$ from the channels of the H-shaped slots so as to have, for each cathode 1, and respectively each anode 3, of the battery 100 a main body 111, and respectively 131, separated from a secondary body 112, and respectively 132, by a space free from any electrode material, electrolyte and/or current collector substrate 113, and respectively 133.

It is a case there of a particularly advantageous feature of the invention since this makes it possible to improve the quality of the cutout compared with the prior art and to avoid the presence of a short-circuit at the lateral edges of the battery.

The application WO 2016/001584 describes stacks of a plurality of elementary cells, consisting of anode and cathode sheets stacked in alternation and offset laterally (see FIG. 12), encapsulated in an encapsulation system in order to provide protection of the cell of the battery with respect to the atmosphere. The cutting of these encapsulated stacks making it possible to obtain unitary batteries, with anode and cathode connections bare, is implemented on a cutting plane passing through an alternating succession of electrode and encapsulation system. Through the difference in density existing between the electrode and the encapsulation system of the battery of the prior art, the cutting made along this cutting plane gives rise to a risk of tearing of the encapsulation system around the cutting plane, and thus the creation of short-circuits. In the prior art, during the encapsulation, the encapsulation layer fills the interstices of the stack of sheets carrying U-shaped cutouts. This encapsulation layer introduced at these interstices is thick and does not adhere very well to the stack, causing this risk of tearing of the encapsulation system during the subsequent cutting.

According to the present invention, this risk is eliminated with the use of sheets carrying H-shaped cutouts, since the H-shaped thermopressed mechanical structure is extremely rigid around the cutout, because of the alternating superimposition of cathode and anode sheets. The use of such a rigid structure, with the use of sheets carrying H-shaped cutouts, makes it possible to reduce the number of defects during cuts, to increase the cutting speed and thus to improve the efficiency of the production of the batteries.

According to the invention, the cutouts $D'_n$ and $D_n$ are made through the anodes and the cathodes with comparable density giving rise to a clean cutout of better quality. In addition, the presence of a space free from any electrode material, electrolyte and/or current-collector substrate prevents any risk of short-circuit.

With reference now to FIGS. 9 to 11, there is an illustration of one 100 of the batteries according to the invention. The median axes, respectively longitudinal and lateral, of this battery are denoted X100 and Y100. The lateral edges are denoted 101 and 102, the longitudinal edges of this battery 103 and 104. Moreover each cathode is denoted 110, and each anode 130. The number of these cathodes, which is identical to the number of these anodes, corresponds to the number of cathode sheets and anode sheets of the aforementioned stack.

As shown in FIG. 9, namely in plan view, the free spaces of the cathodes are superimposed. In addition, according to this same plan view, the free spaces of the anodes are superimposed. Finally, according to this same plan view, the free spaces of the cathodes and anodes are not coincident. This is in particular shown, by way of example, in FIG. 10.

The free space (113) connects the opposite longitudinal edges of the battery, which are shown as upper and lower in FIG. 9. This free space extends between the opposite longitudinal edges of the battery separating, for each anode and each cathode, a main body from a secondary body.

Each cathode 110 comprises a main body 111, a secondary body 112 situated on a first lateral edge 101, and a space free from any electrode material, electrolyte and/or current-collector substrate 113. The latter, the width of which corresponds to that of the channel 18 of the slot 14 described above, extends between the longitudinal edges 103 and 104. In a similar manner, each anode 130 comprises a main body 131, and a secondary body 132 located on the lateral edge 102, opposite to the edge 101. The main body 131 and the secondary body 132 are separated by a space 133 free from any electrode material, electrolyte and/or current-collector substrate, connecting the edges 103 and 104, i.e. extending between the longitudinal edges 103 and 104. The two free spaces 113 and 133 are mutually symmetrical, with respect to the median axis Y100.

The width $L_{113}$ of each free space 113 corresponds to the width of the channel 18, belonging to the slot described in the preceding figures. Moreover, the width $L_{112}$ of each secondary body 112 corresponds to the distance $D_{20}$, as described with reference to FIG. 6 or to FIG. 8.

FIG. 13 illustrates an additional variant of the invention. In this FIG. 13 the mechanical elements similar to those in FIGS. 1 to 11 illustrating the first embodiment are therein allocated the same reference numbers increased by the number 1000.

This second variant embodiment differs from the first variant essentially in that the H-shaped slots 1014 are distributed along lines $L_1$ to $L_y$, disposed one below the other, and along rows $R_1$ to $R_x$ provided alongside each other. In this way at least one of the vertical main recesses 1016 of the slot positioned in row $R_n$ is coincident with at least one of the vertical main recesses 1016 of the adjacent slot positioned in row $R_{n-1}$ and/or $R_{n+1}$. In this case, the two adjacent rows are not separated by strips of material. As shown in FIG. 13, two adjacent lines are separated by bridges of material 1020, the height of which is denoted $H_{1020}$, which is between 0.05 mm and 5 mm. These bridges of material confer on the anode and cathode sheets sufficient mechanical rigidity for them to be able to be manipulated easily.

In this second variant of the invention, the H-shaped slots 1014 may preferably be the same as in the first variant. The slot 1014 is preferably formed by two vertical and parallel main recesses 1016, which are connected in the top part thereof by a horizontal channel 1018, preferably perpendicular to the two vertical main recesses 1016.

Each cathode is provided with various lines and rows of slots 1014. Each anode is also provided with various lines and rows of slots 1034, provided in the same number as the slots 1014.

The structure of each slot 1034 is substantially similar to that of each slot 1014, namely that this slot 1034 comprises two vertical main recesses 1036, connected by a channel 1038. The dimensions of the vertical main recesses 1036 are identical to those of the vertical main recesses 1016 and, in a similar manner, the dimensions of the channels 1038 are similar to those of the channels 1018.

In plan view, the vertical main recesses 1036 are superimposed with the vertical main recesses 1016. The only difference between the slots 1014 and 1034 lies in the fact that the channels 1038 are provided at the bottom part. As shown in particular by FIG. 14, the channels 1018 and 1038 are mutually symmetrical in plan view, with respect to the median axis of the Hs, which is denoted XH'.

It is supposed that the stack of the anode and cathode sheets described above is subjected to steps aimed at ensuring the global mechanical stability thereof. These steps, of a type known per se, include in particular thermopressing of the various layers. As will be seen below, this stack allows the formation of individual batteries, the number of which is equal to the product between the number of lines Y and the number of rows X.

For this purpose, with reference to FIG. 14, three lines $L_{n-1}$ to $L_{n+1}$ and three rows $R_{n-1}$ to $R_{n+1}$ have been illustrated. According to the invention, two cutouts $D_n$ and $D'_n$ per line of slots are produced. Each cutout, which is done in a through manner, namely it extends over the whole of the height of the stack, is produced in a manner known per se. By way of non-limitative examples, cutting by sawing, in particular cutting by swaging, cutting by guillotine or cutting by laser, will be mentioned.

Each cutout is produced between a respective channel and the facing end of the H. It is supposed that the thickness of said cutout is ignored. The cutouts are produced both through the anodes and the cathodes, namely at a distance $D_{1020}$ from the channels of the H-shaped slots so as to have, for each cathode 1110 and respectively each anode 1130 of the battery 1100, a main body 1111 and respectively 1131, separated from a secondary body 1112 and respectively 1132 by a space free from any electrode material, electrolyte and/or current-collector substrate 1113, respectively 1133, as illustrated in FIG. 15. This is a particularly advantageous feature of the invention since this makes it possible to improve the quality of the cutout compared with the prior art and to avoid the presence of short-circuit at the lateral edges of the battery. Each final battery 1100 is delimited, at the top and bottom, by the two cutouts and, to the right and to the left, by the internal faces of the vertical main recesses of the H. In FIG. 13 the batteries 1100 once cut by the cutout lines $D_n$ and $D'_n$ have been hatched, the areas 1040 of the sheets of the stack, which do not form the batteries, have been illustrated with dots, whereas the volume of the slots is left blank.

According to the invention, the cutouts $D'_n$ and $D_n$ are produced through the anodes and cathodes with a comparable density giving rise to a clean cutout of great quality. In addition the presence of a space free from any electrode material, electrolyte and/or current-collector substrate prevents any risk of short-circuit.

As shown in FIG. 15, each cathode 1110 comprises a main body 1111, a secondary body 1112 located on a first lateral edge 1101, and a space 1113 free from any electrode material, electrolyte and/or current-collector substrate. The latter, the width of which corresponds to that of the channel 1018 of the slot 1014 described above, extends between the longitudinal edges. In a similar manner, each anode 1130 comprises a main body 1131 and a secondary body 1132 situated on the lateral edge 1102, opposite to the edge 1101. The main body 1131 and the secondary body 1132 are separated by a space 1133 free from any electrode material, electrolyte and/or current-collector substrate, connecting the longitudinal edges, i.e. extending between the longitudinal edges 1103 and 1104. The two free spaces 1113 and 1133 are mutually symmetrical, with respect to the median axis Y100.

The width $L_{1113}$ of each free space 1113 corresponds to the width of the channel 1018, belonging to the slot described in the preceding figures. Moreover, the width $L_{1112}$ of each secondary body 1112 corresponds to the distance $D_{1020}$, as described previously.

The battery 1100 obtained according to the second variant of the invention is in every respect identical to that obtained according to the first variant of the invention even though the arrangement of the slots 1014 is different.

In a third variant of the invention that is not shown in the figures, the H-shaped slots 14/1014 can be distributed along the lines $L_1$ to $L_y$, disposed one underneath the other, and along the rows $R_1$ to $R_x$ provided alongside each other. In this way, on the same anode and/or cathode sheet, the H-shaped slots 14/1014 are disposed, according to the first and second variant of the invention, on the anode and/or cathode sheets, so as to keep sufficient mechanical rigidity for these sheets to be able to be manipulated easily and so that the stack can advantageously define a maximum number of unitary batteries.

The battery 1100 obtained according to the third variant of the invention is in every respect identical to that obtained according to the first and/or second variants of the invention even though the arrangement of the slots 14/1014 on the anode and/or cathode sheets is different.

A comparison between FIGS. 11 and 12 makes it possible to highlight advantages of the invention. This is because substantially the entire total volume of the battery is occupied by useful material, i.e. material that contributes to the electrochemical functioning of the battery 100. This is because only the two free spaces 133/1133, which are very small, cannot be considered to be useful material. In this regard, with reference to FIG. 10, it is noted that the free faces 112' of the secondary cathode bodies fit flush with the free spaces 131' of the main body of the anodes, whereas the free faces 132' of the secondary anode bodies fit flush with the free faces 111' of the main body of the cathodes. In other words, the opposite lateral edges of the battery according to the invention, comprising electrode materials, are substantially continuous, in comparison with those of the prior art illustrated in FIG. 12, which are discontinuous because of the presence of the recesses.

The "free face of the secondary body" corresponds to the face belonging to the secondary body that is opposite to the main body.

The "free face of the main body" corresponds to the face belonging to the main body that is opposite to the secondary body.

Furthermore, the presence of free spaces on each anode layer and respectively cathode layer of the battery makes it possible to dispense with the use of any encapsulation system, i.e. of any insulating material, such as parylene, in the battery, these free spaces fulfilling the role of electrical insulator. The final steps of manufacture of batteries, such as encapsulation, are facilitated thereby. It is no longer necessary, as in the prior art and illustrated in FIG. 12, to insulate the recessed regions 210", 230" in the battery, i.e. to fill in the interstices of the structure of the prior art with an encapsulation system, to fill in the space present in the U-shaped cutouts positioned in opposite orientations and offset by an encapsulation system in order to avoid any short-circuit. The use of a rigid structure according to the invention, with the use of sheets carrying H-shaped cutouts, facilitates the encapsulation and makes it possible to reduce the encapsulation thicknesses compared with the prior art. Encapsulation systems of the multilayer type with thinner and more rigid layers than those of the prior art can be envisaged.

Advantageously, after the step of stacking the anode and cathode sheets, the heat treatment thereof allowing assembly of the battery is implemented at a temperature of between 50° C. and 500° C., preferably at a temperature below 350° C., and/or the mechanical compression of the stack of anode and cathode sheets to be assembled is implemented at a pressure between 10 and 100 MPa, preferably between 20 and 50 MPa. In a particular embodiment, it is advantageous, after the step of stacking and heat treatment thereof, to encapsulate the stack by depositing an encapsulation system in order to provide protection of the cell of the battery with respect to the atmosphere. The encapsulation system must be chemically stable, withstand a high temperature and be impermeable to the atmosphere in order to fulfil its function of barrier layer. Advantageously, the stack of anode sheets and cathode sheets according to the invention can be covered with a sequence, preferably z sequences, of an encapsulation system comprising:

a first covering layer, preferably selected from parylene, type F parylene, polyimide, epoxy resins, silicone, polyamide and/or a mixture thereof, deposited on the stack of anode and cathode sheets, a second covering layer composed of an electrically insulating material, deposited by depositing atomic layers on said first covering layer.

This sequence may be repeated z times with $z \geq 1$. This multilayer sequence has a barrier effect. The more the sequence of the encapsulation system is repeated, the greater will be this barrier effect. It will be all the greater, the greater the number of thin layers deposited.

Typically, the first covering layer is made from polymer, for example silicone (deposited for example by impregnation or by plasma enhanced chemical vapor deposition using hexamethyldisiloxane (HMDSO)) or from epoxy resin, or from polyimide, from polyamide, or from polyparaxylylene (better known by the term parylene). This first covering layer makes it possible to protect the sensitive elements of the battery from the environment thereof. The thickness of said first covering layer is preferably between 0.5 μm and 3 μm.

Advantageously, the first covering layer may be made from type C parylene, type D parylene, type N parylene (CAS 1633-22-3), type F parylene or a mixture of type C, D, N and/or F parylene. Parylene (also referred to as polyparaxylylene or poly(p-xylylene)) is a dielectric, transparent and semicrystalline material that has high thermodynamic stability, excellent resistance to solvents and very low permeability. Parylene also has barrier properties making it possible to protect the battery from the external environment thereof. The protection of the battery is increased when this first covering layer is produced from type F parylene. This first covering layer is advantageously obtained by condensing gaseous monomers deposited by chemical vapor deposition (CVD) on the surfaces, which makes it possible to have a conformal, thin and uniform covering of all the accessible surfaces of the stack. This first covering layer is advantageously rigid; it cannot be considered to be a flexible surface.

The second covering layer is composed of an electrically insulating material, preferably inorganic. This second covering layer advantageously has a very low WVTR coefficient, preferably less than $10^{-5}$ g/m²·d. It is preferably deposited by depositing atomic layers (ALD), so as to obtain a conformal covering of all the accessible surfaces of the stack previously covered with the first covering layer. The layers deposited by ALD are very fragile mechanically and require a rigid support surface for fulfilling their protective role. Depositing a fragile layer on a flexible surface would lead to the formation of cracks, causing a loss of integrity of this protective layer. Moreover, the growth of the layer deposited by ALD is influenced by the nature of the substrate. A layer deposited by ALD on a substrate having areas of different chemical natures will have a non-homogeneous growth, which may cause a loss of integrity of this protective layer.

Techniques of deposition by ALD are particularly well adapted for covering surfaces having high roughness in a completely impervious and conforming manner. They make it possible to produce conformal layers, free from defects, such as holes (layers referred to as "pinhole free") and represent very good barriers. The WVTR coefficient thereof is extremely low. The WVTR (water vapor transmission rate) coefficient makes it possible to evaluate the permeability to water vapor of the encapsulation system. The lower the WVTR coefficient, the more impervious is the encapsulation system.

The second covering layer can advantageously be deposited by plasma-enhanced chemical vapor deposition (PECVD) or by chemical vapor deposition of the HDPCVD (high density plasma chemical vapor deposition) type or of the ICPCVD (inductively coupled plasma chemical vapor deposition) type.

This second covering layer preferably has a thickness of between 10 nm and 10 μm, preferentially a thickness of between 10 nm and 50 nm. The thickness of this second layer is advantageously selected according to the level of impermeability to gases required, i.e. the WVTR coefficient required, and depends on the deposition technique used, in particular from ALD, PECVD, HDPCVD and ICPCVD.

The second covering layer may be made from a ceramic material, vitreous material or vitroceramic material, for example in the form of oxide, of the $Al_2O_3$, $Ta_2O_5$, silica, nitride, in particular silicon nitride, phosphates, oxynitride or siloxane type.

This second covering layer deposited by ALD, PECVD, HDPCVD or ICPCVD on the first covering layer makes it possible firstly to ensure the impermeability of the structure, i.e. to prevent migration of water inside the object, and secondly to protect the first covering layer, preferably of type F parylene, from the atmosphere, in particular from air and moisture, and from heat exposure in order to avoid degradation thereof. This second covering layer improves the service life of the encapsulated battery.

Alternatively, the encapsulation system, making it possible to provide protection of the battery cell, or of the stack of anode sheets and cathode sheets according to the invention, with respect to the atmosphere, may consist of a sequence, preferably of z' sequences, comprising a first alternative covering layer having a very low WVTR coefficient, preferably less than $10^{-5}$ g/m²·d. This sequence may be repeated z' times with $z \geq 1$. It exhibits a barrier effect, which is all the greater, the higher the value of z'. The encapsulation of the stack of anode and cathode sheets in this sequence of the encapsulation system, preferably in z' sequences, makes it possible to reduce to the maximum extent the WVTR coefficient of the encapsulation, i.e. to increase the impermeability of the stack.

The thickness of said first alternative covering layer is preferably between 0.5 μm and 50 μm.

This alternative covering layer may be composed of a ceramic material and/or of a glass with a low melting point, preferably a glass the melting point of which is below 600° C., deposited at the external periphery of the stack of anode and cathode sheets. The ceramic and/or glass material used in this layer is advantageously selected from:

a glass with a low melting point (typically <600° C.), preferably $SiO_2$—$B_2O_3$; $Bi_2O_3$—$B_2O_3$, ZnO—$Bi_2O_3$—$B_2O_3$, $TeO_2$—$V_2O_5$, PbO—$SiO_2$, oxides, nitrides, oxynitrides, $Si_xN_y$, $SiO_2$, SiON, amorphous silicon or SiC.

These glasses can be deposited by moulding or by dip coating.

The ceramic materials are advantageously deposited by PECVD or preferentially by HDPCVD or by ICPCVD at low temperature; these methods make it possible to deposit a layer having good impermeability properties.

Advantageously, the alternative encapsulation system may comprise z' alternative covering layers of different natures in order to reduce the WVTR coefficient of the encapsulation, i.e. to increase the impermeability of the stack. By way of example, the encapsulation system may comprise a first layer composed of a ceramic material, a second layer composed of a glass with a low melting point disposed on the first layer, and vice versa.

The encapsulation in a glass film may be obtained by depositing an ink comprising oxides, phosphates, borates and/or precursors of a low melting point glass, followed by sintering.

In this way a rigid impermeable encapsulation is obtained, which prevents in particular the passage of water vapor at the interface between the encapsulation system and the terminations.

The permeance to water vapor may be measured by means of a method that is the subject of U.S. Pat. No. 7,624,621 and which is also described in the publication "Structural properties of ultraviolet cured polysilazane gas barrier layers on polymer substrates" by A. Mortier et al, which appeared in the journal Thin Solid Films 6+550 (2014) 85-89.

The stack of anode and cathode sheets thus encapsulated in this sequence of the encapsulation system, preferably in z sequences, or in the alternative encapsulation system, can then be covered with a last covering layer so as to mechanically protect the stack thus encapsulated and optionally to confer an aesthetic appearance thereon. This last covering layer protects and improves the service life of the battery. Advantageously, this last covering layer is also selected to withstand a high temperature, and has sufficient mechanical strength to protect the battery during subsequent use thereof. Advantageously, the thickness of this last covering layer is between 1 µm and 50 µm. Ideally, the thickness of this last covering layer is approximately 10-15 µm, such a thickness range makes it possible to protect the battery against mechanical damage.

This last covering layer is preferably based on epoxy resin, polyethylene naphthalate (PEN), polyimide, polyamide, polyurethane, silicone, sol-gel silica or organic silica. Advantageously, this last covering layer is deposited by dipping.

The stack of anode and cathode layers thus coated is next cut by any suitable means along the cutting lines $D'_n$ and $D_n$ so as to bare the anode and cathode connections and to obtain unitary batteries.

In the case of batteries impregnated with a liquid electrolyte, the impregnation of the battery by a liquid electrolyte is advantageously implemented, after the unitary batteries the anode and cathode connections of which are bared are obtained, by a phase carrying lithium ions such as liquid electrolytes or an ionic liquid containing lithium salts; this phase carrying lithium ions penetrates the battery by capillarity.

Terminations (electrical contacts) are added at the point where the cathode and respectively anode connections are visible (not coated with insulating electrolyte). These contact areas are preferably disposed on opposite sides of the stack of the battery in order to collect the current (lateral current collectors) or on adjacent sides. The connections are metalized by means of techniques known to a person skilled in the art, preferably by immersing in a conductive epoxy resin and/or a molten tin bath. Preferably, the terminations are formed, in the vicinity of the cathode and anode connections, by a first stack of layers successively comprising a first layer of a material filled with graphite, preferably epoxy resin filled with graphite, and a second layer comprising a metallic copper obtained from an ink filled with copper nanoparticles deposited on the first layer. This first stack of terminations is next sintered by infrared flash lamp so as to obtain a covering of the cathode and anode connections by a layer of metallic copper.

According to the final use of the battery, the terminations may additionally comprise a second stack of layers disposed on the first stack of terminations successively comprising a first layer of a tin-zinc alloy deposited, preferably by dipping in a molten tin-zinc bath, so as to ensure impermeability of the battery at less cost, and a second layer based on pure tin deposited by electrodeposition or a second layer comprising an alloy based on silver, palladium and copper deposited on this first layer of the second stack.

The terminations make it possible to take up the alternately positive and negative electrical connections on each of the ends. These terminations make it possible to implement the electrical connections in parallel between the various battery elements. For this purpose, only the cathode connections emerge on one end, and the anode connections are available on another end.

The battery according to the invention may be a lithium-ion microbattery, a lithium-ion minibattery, or a high-power lithium-ion battery. In particular, it may be designed and sized so as to have a capacity of less than or equal to approximately 1 mAh (normally referred to as a "microbattery"), so as to have a power greater than approximately 1 mAh up to approximately 1 Ah (normally referred to as a "minibattery"), or so as to have a capacity greater than approximately 1 Ah (normally referred to as a "power battery"). Typically, microbatteries are designed so as to be compatible with microelectronic manufacturing methods.

The batteries in each of these three power ranges may be produced:

either with layers of the "completely solid" type, i.e. devoid of impregnated liquid or viscous phases (said liquid or viscous phases being able to be a medium conducting lithium ions, capable of acting as an electrolyte), or with layers of the mesoporous "completely solid" type, impregnated with a liquid or viscous phase, typically a medium conducting lithium ions, which spontaneously enter inside the layer and which no longer merge from this layer, so that this layer can be considered to be quasi-solid, or with impregnated porous layers (i.e. layers having a lattice of open pores that can be impregnated with a liquid or viscous phase, and which confers moist properties on these layers).

What is claimed is:

1. A battery comprising at least one anode and at least one cathode, arranged on top of one another in an alternating manner, said battery comprising lateral edges comprising an anode connection area and a cathode connection area, laterally opposite the anode connection area, and longitudinal edges, wherein the lateral edges and the longitudinal edges of the battery enclose the at least one anode and the at least one cathode, in which the anode comprises a current collector substrate and at least one anode layer, and the cathode comprises:

a current collector substrate and at least one cathode layer, at least one of the anode and of the cathode comprising a layer of an electrolyte material or of a separator impregnated with an electrolyte, so that the battery comprises successively at least one anode layer, at least one layer of an electrolyte material or of a separator impregnated with an electrolyte, and the at least one cathode layer, characterized in that each anode and each cathode comprises a respective main body and a respective secondary body, the main body of the cathode being in contact with the lateral edge comprising the cathode connection area and the secondary body being in contact with the lateral edge comprising the anode contact area, the main body of the cathode being electrically insulated from the secondary body of the cathode by a free space being free from any electrode material and current-collector substrate extending between the opposite longitudinal edges of the battery, and the main body of the anode being in contact with the lateral edge comprising the anode connection area and the secondary body being in contact with the lateral edge comprising the cathode contact area, the main body of the anode being electrically insulated from the secondary body of the anode by a free space being free from any electrode material and current-collector substrate extending between the opposite longitudinal edges of the battery.

2. The battery according to claim 1, characterized in that, in plan view, the free spaces of the cathodes are superimposed.

3. The battery according to claim 1, characterized in that, in plan view, the free spaces of the anodes are superimposed.

4. The battery according to claim 1, characterized in that, in plan view, the free spaces of the cathodes and of the anodes are not coincident.

5. The battery according to claim 1, characterized in that free faces of the secondary bodies respectively of the cathodes and of the anodes, which are opposite to the free space, fit flush with the free faces of the main body respectively of the anodes and of the cathodes.

6. The battery according to claim 1, characterized in that it comprises an encapsulation system totally covering four of the six faces of said battery, the remaining two faces comprising an anode connection area and a cathode connection area.

7. The battery according to claim 6, characterized in that the encapsulation system comprises:

at least one first covering layer deposited on the battery, and at least one second covering layer composed of an electrically insulating material, deposited by deposition of atomic layers on said at least one first covering layer, on the understanding that this sequence of at least one first covering layer and of at least one second covering layer may be repeated z times with z>1.

8. The battery according to claim 1, characterized in that the anode connection area and the cathode connection area are covered by a termination system.

9. The battery according to claim 8, characterized in that the termination system comprises successively:

a first layer of a material filled with graphite, and a second dense layer of metallic copper arranged on the first layer of the termination system.

10. The battery according to claim 1, characterized in that the width of the free space is between 0.01 mm and 0.5 mm.

11. The battery according to claim 1, characterized in that the width of the secondary bodies is between 0.05 mm and 2 mm.

12. The battery as claimed in claim 1, wherein the free space is free of insulating material.

13. The battery as claimed in claim 1, wherein the free space is free of any material.

14. The battery as claimed in claim 1, wherein the free space is empty.

15. The battery as claimed in claim 1, wherein the width of the free space is inferior to the width of the secondary body.

* * * * *